(12) United States Patent
Kim et al.

(10) Patent No.: US 12,483,677 B2
(45) Date of Patent: Nov. 25, 2025

(54) ELECTRONIC DEVICE AND METHOD FOR CORRECTING SENSED DATA

(71) Applicant: KOREA AUTOMOTIVE TECHNOLOGY INSTITUTE, Cheonan-si (KR)

(72) Inventors: Taelim Kim, Cheonan-si (KR); Seongjin Kwon, Cheonan-si (KR); Seoksan Shin, Cheonan-si (KR)

(73) Assignee: KOREA AUTOMOTIVE TECHNOLOGY INSTITUTE, Chungcheongnam-Do (KR)

( * ) Notice: Subject to any disclaimer, the term of this patent is extended or adjusted under 35 U.S.C. 154(b) by 287 days.

(21) Appl. No.: 18/010,924

(22) PCT Filed: Jul. 23, 2021

(86) PCT No.: PCT/KR2021/009599
§ 371 (c)(1),
(2) Date: Dec. 16, 2022

(87) PCT Pub. No.: WO2022/085904
PCT Pub. Date: Apr. 28, 2022

(65) Prior Publication Data
US 2023/0239438 A1 Jul. 27, 2023

(30) Foreign Application Priority Data

Oct. 19, 2020 (KR) .................. 10-2020-0135182
Oct. 22, 2020 (KR) .................. 10-2020-0137287

(51) Int. Cl.
*B60W 60/00* (2020.01)
*G06V 20/58* (2022.01)
(Continued)

(52) U.S. Cl.
CPC ............. *H04N 7/183* (2013.01); *G06V 20/58* (2022.01); *G06V 20/625* (2022.01); *G07C 5/008* (2013.01);
(Continued)

(58) Field of Classification Search
CPC ..... H04N 7/183; H04N 5/2628; H04W 4/029; G06V 20/58; G06V 20/625; G06V 2201/08; G07C 5/008
See application file for complete search history.

(56) References Cited

U.S. PATENT DOCUMENTS

2018/0079419 A1  3/2018  Yamamoto et al.
2018/0357493 A1  12/2018 Takamatsu et al.
(Continued)

FOREIGN PATENT DOCUMENTS

JP  2016-212663 A  12/2016
KR  10-2010-0111543 A  10/2010
(Continued)

OTHER PUBLICATIONS

Bae, Joo Chul—A Cooperative Positioning System and Extended LDM Implementation using V2X communication, Camera, Radar, and GPS Sensor Fusion; Dept. of Electronics and Computer Engineering; 2019.
(Continued)

*Primary Examiner* — Justin S Lee
(74) *Attorney, Agent, or Firm* — Schmeiser, Olsen & Watts LLP

(57) ABSTRACT

At least one processor of an electronic device in a vehicle may be configured to: receive broadcast information which is broadcast from a beacon and includes reference data indicating the relative positional relationship between a designated object positioned in a designated place and the position of the beacon and the data of the designated place;
(Continued)

in response to reception of the broadcast information, acquire sensed data indicating the relative positional relationship between the designated object and the vehicle through at least one sensor of the electronic device on the basis of the data of the designated place; in response to acquiring the sensed data, identify the difference between the sensed data and the reference data; identify whether the difference lies outside of a reference range; and determine correction of the at least one sensor to be required, on the basis of identification that the difference lies outside of the reference range.

16 Claims, 14 Drawing Sheets

(51) Int. Cl.
| | |
|---|---|
| *G06V 20/62* | (2022.01) |
| *G07C 5/00* | (2006.01) |
| *H04N 5/262* | (2006.01) |
| *H04N 7/18* | (2006.01) |
| *H04W 4/029* | (2018.01) |

(52) U.S. Cl.
CPC .......... *H04N 5/2628* (2013.01); *H04W 4/029* (2018.02); *G06V 2201/08* (2022.01)

(56) References Cited

U.S. PATENT DOCUMENTS

2020/0180649 A1  6/2020  Reyes Baron
2021/0263166 A1* 8/2021  Zheng .............. G08G 1/096783

FOREIGN PATENT DOCUMENTS

| KR | 20100108824 A | 10/2010 |
|---|---|---|
| KR | 10-2013-0055836 | 5/2013 |
| KR | 20160047724 A | 5/2016 |
| KR | 10-1784629 B1 | 10/2017 |
| KR | 10-1806029 | 11/2017 |
| KR | 20180000672 A | 1/2018 |
| WO | 2017189361 A1 | 11/2017 |

OTHER PUBLICATIONS

PCT International Search Report for PCT Application No. PCT/KR2021/009599, dated Nov. 3, 2021.

* cited by examiner

FIG. 2

```
struct aata_i{
    double x_i;          % x value of RTK-GPS information of surrounding vehicle i (based on global Cartesian coordinate system)
    double y_i;          % x value of RTK-GPS information of surrounding vehicle i (based on global Cartesian coordinate system)
    double z_i;          % x value of RTK-GPS information of surrounding vehicle i (based on global Cartesian coordinate system)
    double r_i;          % r value from surrounding vehicle i to target vehicle
                         (based on polar coordinate system, origin point, surrounding vehicle)
    double theta_i;      % θ value formed by surrounding vehicle i and target vehicle
                         (based on polar coordinate system, origin point, surrounding vehicle)
    double phi_i;        % ψ value formed by surrounding vehicle i and target vehicle
                         (based on polar coordinate system, origin point, surrounding vehicle)
    double x_tgt_i;      % estimated x value of target vehicle of surrounding vehicle i (based on global Cartesian coordinate system)
    double y_tgt_i;      % estimated y value of target vehicle of surrounding vehicle i (based on global Cartesian coordinate system)
    double z_tgt_i;      % estimated z value of target vehicle of surrounding vehicle i (based on global Cartesian coordinate system)
```

(a)

$$x\_i \triangleq [[x\_tgt\_i, y\_tgt\_i, z\_tgt\_i]]^T = [x\_i, y\_i, z\_i]^T + [r\_i * \sin\psi\_i * \cos\theta\_i, r\_i * \sin\psi\_i * \sin\theta\_i, r\_i * \cos\psi\_i]^T$$

(b)

ELECTRONIC DEVICE AND METHOD FOR CORRECTING SENSED DATA

CROSS-REFERENCE TO RELATED APPLICATIONS

This application claims priority to PCT Application No. PCT/KR2021/009599, having a filing date of Jul. 23, 2021, which is based on Korean App. No. 10-2020-0137287, having a filing date of Oct. 22, 2020, which is based on Korean Application No. 10-2020-0135182, having a filing date of Oct. 19, 2020, the entire contents all of which are hereby incorporated by reference.

FIELD OF TECHNOLOGY

The following relates to an electronic device and method for correcting sensed data is for an environment recognition sensor which is mounted on an autonomous vehicle and infrastructure.

BACKGROUND

In general, autonomous driving is a core technology for a smart car implementation, and is a vehicle technology in which a smart car automatically drives by identifying a situation on a road although a driver does not control a brake, a handle, an acceleration pedal, etc. For such autonomous driving, it is very important to identify an accurate location of an ego vehicle. Today, a location of an ego vehicle is basically positioned based on GPS information.

However, the GPS-based positioning technology has an average error of 2 m to 5 m in its positioning precision and does not reach less than about 30 cm, that is, a minimum positioning error range that is required for autonomous driving. In particular, there is a shadow area in which positioning is impossible because satellite communication is impossible in an area, such as an underground or a tunnel. Accordingly, in a current autonomous driving positioning technology, research is carried out in a way to supplement positioning through a precision map and data fusion by using expensive sensors, such as a DGPS and LIDAR. An autonomous vehicle service and a V2X service are based on an accurate location.

Today, an actual GPS-based positioning method has a precision problem (an average error: 2 to 5 m). In order to provide a substantial service, precision in GPS-based positioning needs to be an average error of 30 cm or less. A common method for reducing an error of such GPS positioning includes a supplement method using sensors, such as a DGPS, a camera, LIDAR, and radar. However, there are limitations to the sensor because the sensor does not recognize a shadow area (a tunnel, an underground parking lot) and a blind spot.

The Background Technology of the present disclosure was disclosed in Korean Patent No. 10-1806029 (issued on Nov. 30, 2017, SYSTEM AND METHOD FOR DETECTING POSITION OF VEHICLE USING GPS AND UWB).

Meanwhile, various types of failures may occur depending on the use of a vehicle. Since a failure of a vehicle may be directly related to the safety of a user, various types of devices, diagnosis circuits, etc. for detecting such a failure are mounted on the vehicle.

However, failures occurring in a vehicle include failures that are difficult to check in the corresponding vehicle, but that are easy to check in other surrounding vehicles. For example, there is a case in which if a failure has occurred in a taillight of a vehicle, it is difficult for a driver of the corresponding vehicle to recognize the failure, but a driver of a rear vehicle may easily check the failure.

Accordingly, research and development of a method for checking information on a failure of a surrounding vehicle and providing notification of the failure by using a communication function of a vehicle continue.

Meanwhile, the Background Technology of the present disclosure was disclosed in Korean Patent Application Publication No, 10-2013-0055836 (May 29, 2013).

In order to prevent a malfunction of an autonomous vehicle, an electronic device and method for correcting sensed data may determine whether sensed data that is recognized by an autonomous vehicle is within a permissible error range by comparing the sensed data and reference data that is recognized by another vehicle or infrastructure.

If the sensed data of the electronic device is out of the permissible error range, the electronic device may determine that a correction is required, and may transmit the sensed data to another vehicle or infrastructure.

An electronic device and method for correcting sensed data may determine its own relative location for another vehicle by performing communication with an electronic device mounted on the another vehicle.

Furthermore, an electronic device and method for correcting sensed data may determine whether a failure has occurred in an external appearance of a front vehicle by obtaining an image of the front vehicle. An electronic device and method for correcting sensed data may determine whether a failure of a front vehicle is present through a correction for an image although the image is not an image that has been obtained at the front.

SUMMARY

An aspect relates to an electronic device within a vehicle includes a communication circuit, at least one piece of memory configured to store a plurality of instructions, at least one sensor configured to detect a surrounding environment of the vehicle, and at least one processor operatively coupled to the communication circuit, the at least one piece of memory, and the at least one sensor. When the plurality of instructions is executed, the at least one processor may be configured to receive broadcast information that is broadcasted by a beacon and that includes reference data indicative of a relative location relation between a designated object located at a designated place and a location of the beacon and data of the designated place, obtain, through the at least one sensor, sensed data indicative of a relative location relation between the designated object and the vehicle based on the data of the designated place in response to the reception of the broadcast information, identify a difference between the sensed data and the reference data in response to the sensed data being obtained, identify whether the difference is out of a reference range, and determine that a correction of the at least one sensor is required based on the difference being identified as being out of the reference range.

According to an embodiment, a method of driving an electronic device within a vehicle may include an operation of receiving, by at least one processor of the electronic device, broadcast information that is broadcasted by a beacon and that includes reference data indicative of a relative location relation between a designated object located at a designated place and a location of the beacon and data of the designated place through a communication circuit of the electronic device, an operation of obtaining, by the at least one processor, sensed data indicative of a relative location relation between the designated object and the vehicle based on the data of the designated place in response to the reception of the broadcast information, through at least one sensor that is included in the electronic device, an operation of identifying, by the at least one processor, a difference between the sensed data and the reference data in response to the sensed data being obtained, an operation of identifying, by the at least one processor, whether the difference is out of a reference range, an operation of determining, by the at least one processor, that a correction of the at least one sensor is required based on the difference being identified as being out of the reference range, an operation of transmitting, by the at least one processor, the sensed data to infrastructure in response to the correction of the at least one sensor being determined to be required, an operation of receiving, by the at least one processor, a calculated correction value from the infrastructure based on the sensed data, and an operation of correcting, by the at least one processor, the at least one sensor based on the calculated correction value.

According to an aspect of the present disclosure, if an autonomous vehicle (i.e., a target vehicle) cannot use GPS location information or is placed in a GPS shadow area, the target vehicle may request a positioning service from a surrounding vehicle, may receive information on the location of the target vehicle that has been estimated by the surrounding vehicle, and may use the information in autonomous driving.

Furthermore, a front vehicle failure notification device and method according to the present disclosure has an effect in that it can improve driving stability by checking whether a front vehicle has failed in a way that a rear vehicle notifies the front vehicle of a failure of the front vehicle which may be easily checked by the rear vehicle.

Furthermore, the front vehicle failure notification device and method according to the present disclosure has an effect in that the type of failure that has occurred in a front vehicle can be easily checked based on whether images of the front vehicle are symmetrical to each other and by using a preset failure area.

BRIEF DESCRIPTION

Some of the embodiments will be described in detail, with reference to the following figures, wherein like designations denote like members, wherein:

FIG. 2 is an exemplary diagram illustrating data structures of variables and an equation which are used for a 3D Cartesian coordinate estimation unit to estimate global 3D Cartesian coordinates of a target vehicle in FIG. 1;

DETAILED DESCRIPTION

Figure 1:
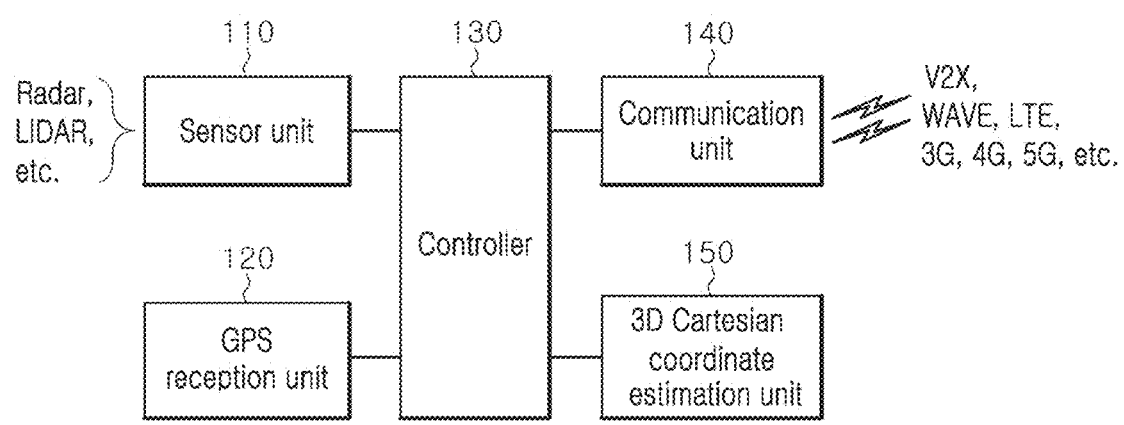
FIG. 1 is an exemplary diagram illustrating a schematic construction of a location estimation apparatus of an autonomous vehicle according to an embodiment of the present disclosure.

Hereinafter, embodiments of a location estimation apparatus and method of an autonomous vehicle according to the present disclosure are described with reference to the accompanying drawings.

In this process, the thicknesses of lines or the sizes of elements illustrated in the drawings may have been exaggerated for the clarity of a description and for convenience' sake. Terms to be described below have been defined by taking into consideration their functions in the present disclosure and may be changed depending on a user or operator's intention or practice. Accordingly, such terms should be defined based on the overall contents of this specification.

FIG. 1 is an exemplary diagram illustrating a schematic construction of a location estimation apparatus of an autonomous vehicle according to an embodiment of the present disclosure.

As illustrated in FIG. 1, the location estimation apparatus of an autonomous vehicle according to the present embodiment includes a sensor unit 110, a GPS reception unit 120, a controller 130, a communication unit 140, and a 3D Cartesian coordinate estimation unit 150.

The location estimation apparatus of an autonomous vehicle according to the present embodiment estimates a location of the vehicle based on information that is received through a sensor, a GPS signal, and the communication unit 140.

The sensor unit 110 may detect an external environment of the vehicle and/or a driving situation of the vehicle. Specifically, the sensor unit 110 may collect an optical signal, a temperature, humidity, an image signal, etc. that are collected from the outside of the vehicle. To this end, the sensor unit 110 may include an optical sensor, a temperature sensor, a humidity sensor, an image sensor, a LIDAR, radar, etc.

Furthermore, the sensor unit 110 may collect information on driving situations of the vehicle, such as a braking distance, direction of travel, speed, acceleration, etc. of the vehicle. To this end, the sensor unit 110 may include an acceleration sensor, a speed sensor, an angle measurement sensor of a steering wheel, etc.

The GPS reception unit 120 may receive GPS signals from satellites. In this case, the GPS reception unit 120 may receive the GPS signals in order to measure vehicle coordinates until the vehicle enters a shadow area of the GPS signals.

The controller 130 estimates a location of the vehicle by processing various types of data, instructions and/or information stored in internal memory (not illustrated). The internal memory (not illustrated) stores a program and data for estimating the location of the vehicle.

Furthermore, the controller 130 may correct an error according to a sensing period, based on a predetermined algorithm, if an RF signal received from the communication unit 140 is distorted by the influence of an external environment or when the sensor unit 110 collects driving information. Furthermore, if a location of the vehicle is estimated based on information collected by each node that transmits an RF signal to the communication unit 140, the controller 130 may include a filtering function for minimizing the influences of a moving speed of the vehicle, a signal collection period of the communication unit 140, and a sensing period of the sensor unit 110 with respect to an error which may occur.

Furthermore, the controller 130 may also perform an operation for excluding the influence of a moving speed, direction, etc. of the vehicle during an operation of measuring a location of the vehicle.

In this case, the controller 130 may include a central processing unit (CPU), a microprocessor unit (MPU), a micro controller unit (MCU), an application processor (AP), an electronic control unit (ECU), or a certain type of a processor which is well known in the technical field of the present disclosure, and may perform an operation on at least one application or program for executing a method according to embodiments of the present disclosure.

Furthermore, the controller 130 may measure the intensity (e.g., RSSI) of a signal that is received through the communication unit 140, may communicate with a surrounding vehicle on which a V2X module, radar, LIDAR, an RTK-GPS terminal, etc. are mounted and that is placed in a line of sight (LOS) environment, through the communication unit 140, and may perform vehicle to everything (V2X) communication with a surrounding vehicle or a surrounding facility through various communication schemes, such as WAVE, LTE, and 5 G.

The communication unit 140 may transmit and receive various signals to and from an external device (e.g., a road facility or a vehicle). In this case, the external device may include a small-sized base station (RSU) that is installed as road infrastructure, for example, and that supports communication between a vehicle and infrastructure, an on-board unit (OBU) of each vehicle that is driving, or a V2X communication unit of each vehicle that is driving.

Furthermore, the communication unit 140 may receive an RF signal from an external device. V2X also supports wired and wireless networking with various types of equipment within the vehicle and may also support communication between the vehicle and a mobile terminal.

Furthermore, the communication unit 140 may include at least one of a mobile communication module and a wired/wireless communication module for communication with an external device through a mobile communication method (e.g., 3G, 4G, 5G, or LTE) as described above.

The 3D Cartesian coordinate estimation unit 150 estimates (calculates) global 3D Cartesian coordinates of a nearby target vehicle (i.e., a vehicle that has requested a positioning service) based on information (e.g., a distance and an angle) on the target vehicle, which has been detected by using a sensor (e.g., radar or a LIDAR) included in an ego vehicle, when receiving a request for a positioning service (or a service that provides estimation information on a location of a vehicle) from the target vehicle (i.e., the vehicle that has requested the positioning service) through V2X communication.

However, a surrounding vehicle capable of estimating (calculating) global 3D Cartesian coordinates of the target vehicle needs to be a vehicle capable of estimating its own absolute location information (its own location information measured by an RTK-GPS) through GPS signals. The reason for this is that the global 3D Cartesian coordinates of the target vehicle correspond to a relative location for the surrounding vehicle (i.e., a vehicle that has received a request for a positioning service).

For reference, FIG. 2 is an exemplary diagram illustrating data structures of variables and an equation, which are used for the 3D Cartesian coordinate estimation unit 150 to estimate global 3D Cartesian coordinates of a target vehicle in FIG. 1. The global 3D Cartesian coordinates of the target vehicle may be estimated by applying variables illustrated in (a) to the equation illustrated in (b).

Hereinafter, the present embodiment is described on an assumption that the controller 130 is the controller 130 of the location estimation apparatus of an autonomous vehicle, which has been installed in a surrounding vehicle (i.e., a surrounding vehicle that has received a request for a positioning service) for convenience of description. Furthermore, in the opposite case, the controller 130 may be the controller 130 of the location estimation apparatus of an autonomous vehicle, which has been installed in a target vehicle (i.e., a vehicle that requests a positioning service).

First, it is assumed that the controller 130 of the location estimation apparatus of an autonomous vehicle, which has been installed in the target vehicle (i.e., the vehicle that requests the positioning service) requests the positioning service (or a service that provides information for estimating a location of a vehicle) from a certain surrounding vehicle through V2X communication.

Accordingly, the controller 130 of the surrounding vehicle that has received the request for the positioning service obtains information on a location of the ego vehicle (its own location information measured by an RTK-GPS) and a distance, an angle, etc. for the target vehicle (i.e., the vehicle that has requested the positioning service), which have been detected by using a sensor (e.g., radar or a LIDAR) provided in the ego vehicle.

Furthermore, the controller 130 of the surrounding vehicle that has received the request for the positioning service estimates (or calculates global 3D Cartesian coordinates of the target vehicle (i.e., the vehicle that has requested the positioning service) based on the obtained information (e.g., the location information of the RTK-GPS and the distance/angle for the target vehicle) through the 3D Cartesian coordinate estimation unit 150. In this case, a known technology may be used in an algorithm that calculates the global 3D Cartesian coordinates.

Furthermore, the controller 130 transfers, to the target vehicle, the estimated (or calculated) global 3D Cartesian coordinates of the target vehicle (i.e., the vehicle that has requested the positioning service) through V2X communication.

In this case, if the number of surrounding vehicles (i.e., a certain surrounding vehicle that has received the request for the positioning service from the target vehicle) is one, the controller 130 of the target vehicle (i.e., the vehicle that has requested the positioning service) uses, as its own location information, the global 3D Cartesian coordinates received from the one surrounding vehicle without any change.

However, if the number of surrounding vehicles (i.e., a certain surrounding vehicle that has received the request for the positioning service from the target vehicle) is two or more, the controller 130 of the target vehicle (i.e., the vehicle that has requested the positioning service) obtains information on the location of the vehicle by re-processing a plurality of pieces of global 3D Cartesian coordinate information received from all of the surrounding vehicles.

For example, a likelihood ratio function, a minimum mean square error (MMSE) estimation method, etc. may be used as a method of re-processing the plurality of pieces of global 3D Cartesian coordinate information.

Figure 3:
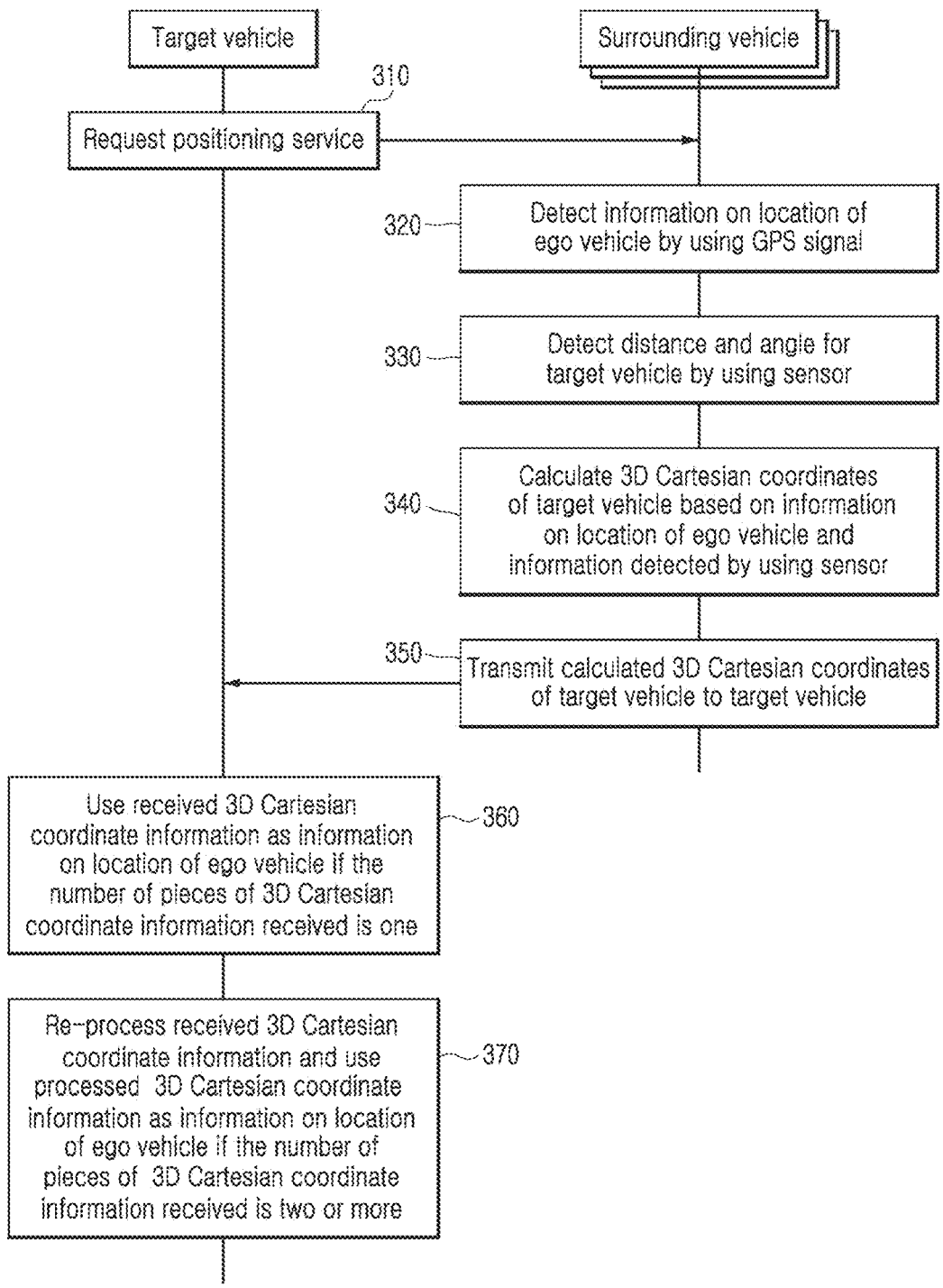
FIG. 3 is an exemplary diagram for describing a location estimation method of an autonomous vehicle according to an embodiment of the present disclosure.

FIG. 3 is an exemplary diagram for describing a location estimation method of an autonomous vehicle according to an embodiment of the present disclosure.

Referring to FIG. 3, it is assumed that the controller 130 of the location estimation apparatus of an autonomous vehicle, which has been installed in a target vehicle (i.e., a vehicle that requests a positioning service), has requested the positioning service (or a service that provides information for estimating a location of a vehicle) from certain surrounding vehicles through V2X communication (310).

Accordingly, the controller 130 of the location estimation apparatus of an autonomous vehicle, which has been installed in the surrounding vehicle that has received the request for the positioning service, measures information on the location of the ego vehicle (its own location information measured by an RTK-GPS) (320), and obtains (detects) information (i.e., information that is necessary for the surrounding vehicle to obtain counterpart coordinates of the target vehicle), such as a distance and an angle for the target vehicle (i.e., the vehicle that has requested the positioning service), which have been detected by using a sensor (e.g., radar, a LIDAR) provided in the ego vehicle (330).

Furthermore, the controller 130 of the location estimation apparatus of an autonomous vehicle, which has been installed in the surrounding vehicle that has received the request for the positioning service, estimates (or calculates) global 3D Cartesian coordinates of the target vehicle (i.e., the vehicle that has requested the positioning service) based on the obtained information (e.g., the location information of the RTK-GPS and the distance/angle for the target vehicle) (340).

Furthermore, the controller 130 of the location estimation apparatus of an autonomous vehicle, which has been installed in the surrounding vehicle that has received the request for the positioning service, transfers (transmits) the estimated (or calculated) global 3D Cartesian coordinates of the target vehicle (i.e., the vehicle that has requested the positioning service) to the target vehicle through V2X communication (350).

In this case, if the number of surrounding vehicles (i.e., a certain surrounding vehicle that has received the request for the positioning service from the target vehicle) is one, the controller 130 of the target vehicle (i.e., the vehicle that has requested the positioning service) uses, as its own location information, the global 3D Cartesian coordinates received from the one surrounding vehicle without any change (360).

However, if the number of surrounding vehicles (i.e., a certain surrounding vehicle that has received the request for the positioning service from the target vehicle) is two or more, the controller 130 of the target vehicle (i.e., the vehicle that has requested the positioning service) obtains information on the location of the vehicle by re-processing a plurality of pieces of global 3D Cartesian coordinate information received from all of the surrounding vehicles (370).

For example, a likelihood ratio function, a minimum mean square error (MMSE) estimation method, etc. may be used as a method of re-processing the plurality of pieces of global 3D Cartesian coordinate information.

The present embodiment has an effect in that if an autonomous vehicle (i.e., a target vehicle) cannot use GPS location information or is placed in a GPS shadow area, the target vehicle can request a positioning service from a surrounding vehicle, can receive information on a location of the target vehicle which has been estimated by the surrounding vehicle, and can use the received information in autonomous driving as described above.

Figure 4:
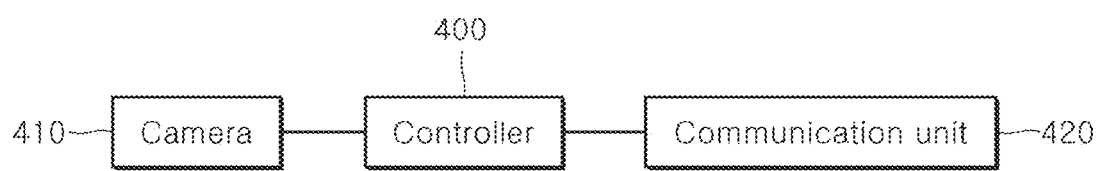
FIG. 4 is a block diagram illustrating a construction of a front vehicle failure notification device according to an embodiment of the present disclosure.
Figure 5:
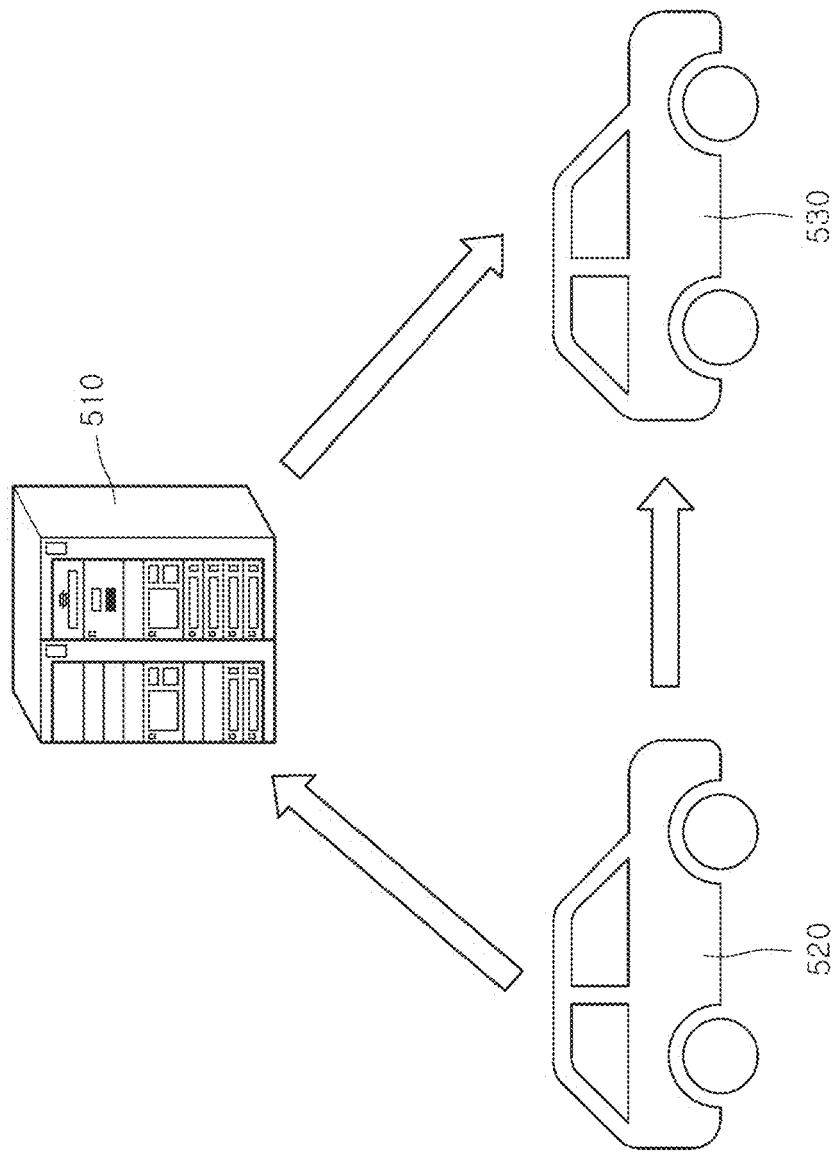
FIG. 5 is an exemplary diagram for describing an information transfer method of the front vehicle failure notification device according to an embodiment of the present disclosure.

FIG. 4 is a block diagram illustrating a construction of a front vehicle failure notification device according to an embodiment of the present disclosure. FIG. 5 is an exemplary diagram for describing an information transfer method of the front vehicle failure notification device according to an embodiment of the present disclosure. The front vehicle failure notification device according to an embodiment of the present disclosure is described as follows with reference to the drawings.

As illustrated in FIG. 4, the front vehicle failure notification device according to an embodiment of the present disclosure includes a controller 400, a camera 410, and a communication unit 420.

The camera 410 is mounted on a vehicle and may photograph a front vehicle. For example, a front camera mounted on a vehicle, a camera for a blackbox, etc. may be used as such a camera. A separate camera for the front vehicle failure notification device according to the present disclosure may be provided.

The communication unit 420 may transmit failure information of a front vehicle detected by the controller 400 by using vehicle-to-vehicle communication (V2V) or vehicle-to-infrastructure communication (V2I) as in contents to be described later.

Such communication of the communication unit 420 may be implemented in various forms, such as communication using a wireless network and communication using a broadcast method. A construction of such a communication device corresponds to contents that are widely known in the technology field of the present disclosure, and a further detailed description thereof is omitted.

The controller 400 may detect a failure of a front vehicle in an image of the front vehicle that is captured by the camera 410.

Specifically, the controller 400 may detect the area of the front vehicle through image processing, such as edge detection, in the front image captured by the camera 410.

The controller 400 may split the obtained image of the front vehicle into left and right images on the basis of the center of the image and may detect a failure of the front vehicle by checking whether the left and right images are symmetrical to each other.

For example, left and right images of a front vehicle, which are obtained if one of the taillights of the front vehicle failed, may not have symmetrical colors in taillight portions. Accordingly, it may be determined that the taillight of the front vehicle has failed.

Furthermore, left and right images of a front vehicle, which are obtained if one of the rear tires of the front vehicle had a failure, such as a puncture, may not have symmetrical wheel shapes in wheel portions. Accordingly, it may be determined that a tire of the front vehicle has failed.

As described above, the controller 400 may compare obtained left and right images of a front vehicle and may determine that a failure has occurred in the front vehicle when the left and right images are not symmetrical to each other. Furthermore, the controller 400 may identify which kind of a failure has occurred in the front vehicle based on a location at which asymmetry has occurred. A pattern of such a location may be preset and stored as a taillight area, a tire area, etc. depending on a shape of a vehicle.

That is, the controller 400 may identify the type of failure which has occurred in the front vehicle by reading a corresponding pattern (for specifying the type of failure) from a storage unit based on a shape (area) of the front vehicle in the front image.

Furthermore, areas that may not be symmetrical to each other, such as a license plate area or a rear wiper area, may be preset for each type of a vehicle. Whether such areas are symmetrical to each other may not be used to detect a failure of the front vehicle.

Furthermore, the controller 400 may obtain identification information of a corresponding vehicle from the obtained image of the front vehicle and may obtain the number of the vehicle as identification information by recognizing the number of the front vehicle, for example.

Meanwhile, in the present disclosure, an image processing scheme, such as edge detection, image processing for comparing whether left and right images are symmetrical to each other, or image processing itself for identifying a license plate is not a core part of the present disclosure, and a further detailed description thereof is omitted because various known image processing methods may be used in the image processing.

The controller 400 may transmit the obtained failure information and identification information of the front vehicle to the front vehicle or infrastructure through the communication unit 420.

For example, as illustrated in FIG. 5, if direct communication with the front vehicle is possible, a rear vehicle 520 may transmit obtained failure information and identification information of a front vehicle 530 to the front vehicle 530 so that the front vehicle 530 can obtain the failure information.

Alternatively, when the rear vehicle 520 transmits the obtained failure information and identification information of the front vehicle 530 in a broadcast way, the front vehicle 530 may identify whether the identification information included in a received message is information corresponding to the ego vehicle by obtaining the identification information.

Alternatively, if the front vehicle 530 and the rear vehicle 520 cannot directly communicate with each other, the rear vehicle 520 may transmit failure information and identification information of the front vehicle 530 to infrastructure 510, such as a control center, so that the infrastructure 510 provides corresponding information to the front vehicle 530.

Figure 6:
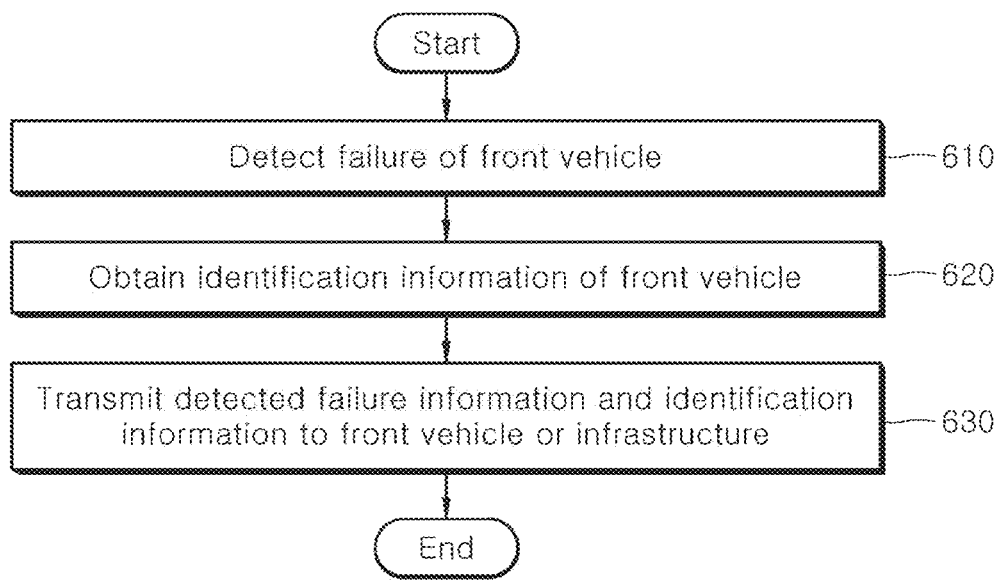
FIG. 6 is a flowchart for describing a front vehicle failure notification method according to an embodiment of the present disclosure.

FIG. 6 is a flowchart for describing a front vehicle failure notification method according to an embodiment of the present disclosure.

As illustrated in FIG. 6, the controller 400 first detects a failure of a front vehicle (610).

For example, the controller 400 may detect the failure of the front vehicle in an image of the front vehicle, which has been captured by the camera 410, may detect the area of the front vehicle in the front image obtained by the camera 410 through image processing, such as edge detection, may split the obtained image of the front vehicle into left and right images on the basis of the center of the obtained image, and may detect the failure of the front vehicle by checking whether the left and right images are symmetrical to each other.

Furthermore, if asymmetry occurs, the controller 400 may determine the type of failure occurred in the front vehicle by checking at which area the asymmetry has occurred. The classification of an area for determining the type of failure may be previously patterned and stored for each vehicle type (i.e., a shape of the vehicle).

The detection of such a detailed failure may be performed in the same manner as that of the front vehicle failure notification device.

Furthermore, the controller 400 obtains identification information of the front vehicle (620). For example, the controller 400 may obtain the number of the front vehicle as the identification information by recognizing the vehicle number in the image of the front vehicle.

Thereafter, the controller 400 transmits the detected failure information and identification information to the front vehicle or infrastructure (630).

For example, the rear vehicle may transmit the obtained failure information and identification information of the front vehicle in a broadcast way so that the front vehicle identifies whether the identification information is information corresponding to the ego vehicle, or the rear vehicle may transmit the failure information and identification information of the front vehicle to the infrastructure, such as a control center, so that the infrastructure provides the corresponding information to the front vehicle.

If information is provided through infrastructure as described above, the front vehicle may be notified of whether a failure has occurred by using a notification method, such as mail, when a V2X communication function is not installed in the front vehicle.

As described above, in the front vehicle failure notification device and method according to an embodiment of the present disclosure, driving stability can be improved by checking whether a vehicle has failed because a rear vehicle notifies a front vehicle of a failure of the front vehicle which may be easily checked by the rear vehicle.

Furthermore, in the front vehicle failure notification device and method according to an embodiment of the present disclosure, the type of failure, which has occurred in a front vehicle, can be easily checked based on whether images of a vehicle are symmetrical to each other and a preset failure area.

Figure 7:
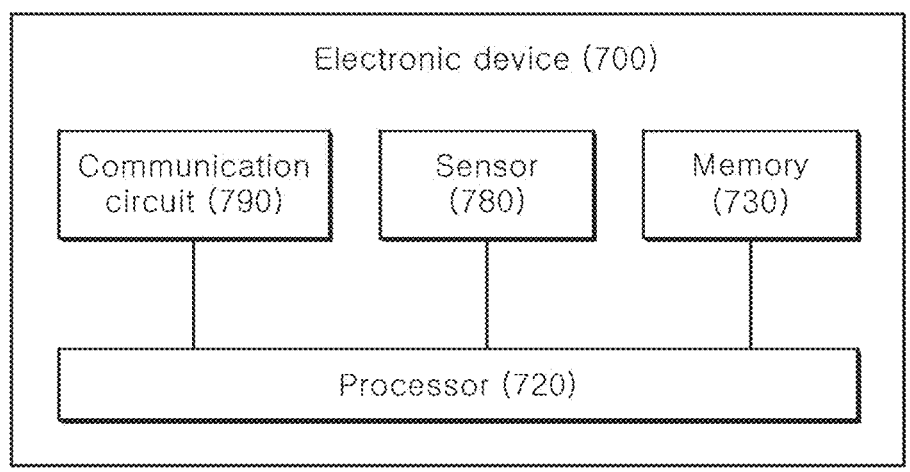
FIG. 7 is a block diagram of an electronic device and method for correcting sensed data according to an embodiment.

FIG. 7 is a block diagram of an electronic device and method for correcting sensed data according to an embodiment.

Figure 8:
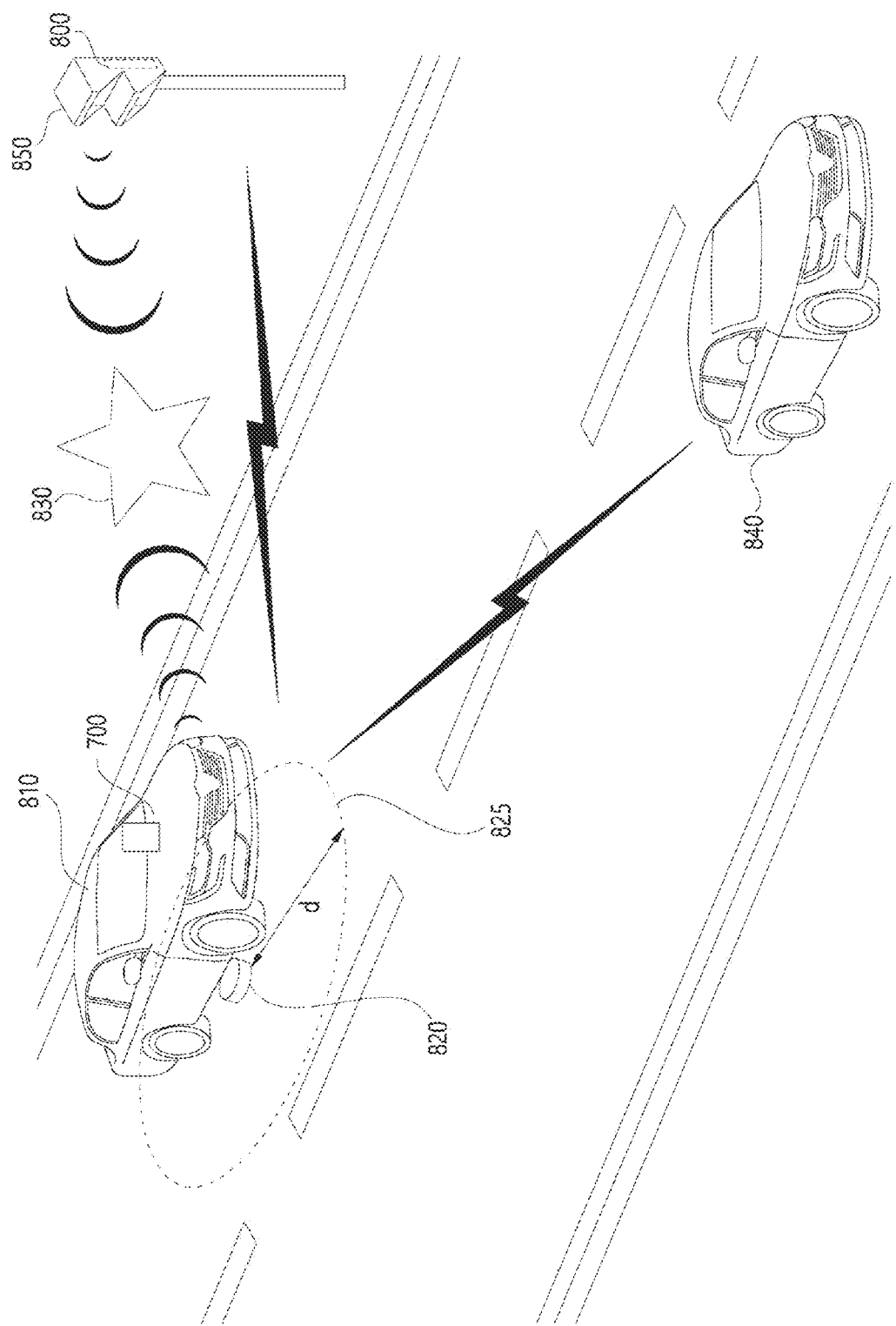
FIG. 8 is a schematic diagram illustrating a system including a vehicle and infrastructure according to an embodiment.

FIG. 8 is a schematic diagram illustrating a system including a vehicle and infrastructure according to an embodiment.

Referring to FIG. 7, the electronic device 700 may include at least some of a processor 720, a communication circuit 790, a sensor 780, or memory 730, but is not limited thereto.

The electronic device 700 may detect an object through the sensor 780. For the sensor 780, reference may be made to the sensor unit 110 in FIG. 1. The sensor 780 may obtain a distance and an angle for the object.

According to an embodiment, the sensor 780 may obtain global coordinates of the object based on GPS coordinates.

The sensor 780 may include a detection sensor, such as radio detecting and ranging (radar) or light detecting and ranging (LIDAR) and/or an image sensor, such as a camera (e.g., the camera 410 in FIG. 4).

According to an embodiment, the sensor 780 may detect a surrounding environment of a vehicle. For example, the sensor 780 may obtain sensed data indicative of a relative location relation with another vehicle or an external object that is placed in front of a vehicle on which the electronic device 700 has been mounted. The sensed data may include a distance from the another vehicle or the external object to the vehicle on which the electronic device 700 has been mounted, an angle formed by a direction (or a direction in which a sensor is directed) in which the front of the vehicle on which the electronic device 700 has been mounted is directed on the basis of the another vehicle or the external object, and a location of the another vehicle or the external object.

According to an embodiment, the sensor 780 may transmit to the processor 720, the sensed data indicative of the relative location relation with the another vehicle or the external object. The processor 720 may obtain a relative distance between the another vehicle, the external object, or a designated object that denotes an external object located at a designated place and a vehicle on which the electronic device 700 has been mounted, based on the received sensed data.

The communication circuit 790 may support the establishment of a communication channel between the electronic device 700 and another electronic device (e.g., an electronic device mounted on another vehicle, an electronic device mounted on infrastructure, or a server) and the execution of communication through an established communication channel. The communication circuit 790 may include a communication processor that is managed independently of the processor 720.

According to an embodiment, the communication circuit 790 may support a 5G network and a next-generation communication technology after the 4G network, for example, a new radio (NR) access technology. The NR access technology may support enhanced mobile broadband (eMBB), massive machine type communications (mMTC), or ultra-reliable and low-latency communications (URLLC). A wireless communication module may support a high frequency band (e.g., an mmWave band) in order to achieve a high data transfer rate, for example. The wireless communication module may support various technologies for securing performance in a high frequency band, for example, technologies, such as beamforming, massive multiple-input and multiple-output (MIMO), full dimensional MIMO (FD-MIMO), an array antenna, analog beam-forming, or large-scale antenna.

According to an embodiment, the communication circuit 790 may support beamforming by including an antenna radiator consisting of an antenna array. A beam that is radiated from the antenna array may have directivity, and thus the processor 720 may determine a relative location relation with another vehicle 840 different from a vehicle 810 through the communication circuit 790.

For the GPS reception unit 120 and the communication unit 140 in FIG. 1 and the communication unit 420 in FIG. 4, reference may be made to the communication circuit 790.

The communication circuit 790 may transmit, to another electronic device, a packet that includes sensed data (a distance, an angle, or a location), obtained through the sensor unit, in at least some thereof.

The communication circuit 790 may perform the conversion of the distance, angle and/or location of the sensed data into values for a minimum unit based on the number of bits and may transmit the converted sensed data to another electronic device. The communication circuit 790 may receive the sensed data from another electronic device (e.g., an electronic device included in another vehicle or another infrastructure).

According to an embodiment, the communication circuit 790 may receive a correction request from the processor 720 and may transfer a correction request flag to another electronic device that has been mounted on another vehicle or infrastructure. The communication circuit 790 may transmit the sensed data of the electronic device 700 to another electronic device that has been mounted on another vehicle or infrastructure. The communication circuit 790 may receive the sensed data of the electronic device, which has been obtained by a sensor included in another electronic device, from the another electronic device that has been mounted on another vehicle or infrastructure.

According to an embodiment, the communication circuit 790 may transmit and receive, to and from the vehicle, information on a location of a vehicle or information indicating whether sensor data obtained from the sensor 780 is abnormal.

According to an embodiment, the communication circuit 790 may receive a signal related to a correction request for the sensor 780 by performing communication with infrastructure or another vehicle. The communication circuit 790 may transfer, to the processor 720, a signal related to the received correction request.

According to an embodiment, the communication circuit 790 may perform communication through a vehicle-to-infrastructure (V2I) communication path between the electronic device 700 and infrastructure for communication with the infrastructure and may perform communication through a vehicle to everything (V2X) path for communication between the electronic device 700 and the external object for communication with an external thing.

According to an embodiment, the memory 730 may store various data that is used by at least one component (e.g., the communication circuit 790, the sensor 780 and/or the processor 720) of the electronic device 700. The data may include software and input data or output data for an instruction related thereto. For example, the memory 730 may include a hardware component for storing data and/or instructions that are input to and/output from the processor 720. The memory 730 may include volatile memory, such as random-access memory (RAM) and/or nonvolatile memory, such as read only memory (ROM), for example. The volatile memory may include at least one of dynamic RAM (DRAM), static RAM (SRAM), cache RAM, and pseudo SRAM (PSRAM), for example. According to an embodiment, the memory 730 may be operatively coupled to the processor 720.

According to an embodiment, the memory 730 may store sensed data, a correction value of the sensor that is autonomously calculated by the electronic device 700, a correction value of the sensor 780 that is received from another vehicle or infrastructure, reference data, or information processed by the processor 720 based on the information (e.g., the correction value and the reference data). The memory 730 may store a distance, angle, and location of a vehicle for calculating processing information of the processor 720 and/or a correction value and/or an algorithm for an operation, such as the transmission and reception time of information.

The memory 730 may store an image that is obtained through the sensor 780 and that includes a visual object corresponding to an external object (e.g., another vehicle different from the electronic device 700). The memory 730 may store images obtained by processing the image through the processor 720.

According to an embodiment, the processor 720 may be electrically or operably (or operatively) coupled with or connected to components (e.g., the communication circuit 790, the sensor 780 and the memory 730) of the electronic device 700. The processor 720 may control an overall operation of the electronic device 700. In an embodiment, the processor 720 may include a single processor core or may include a plurality of processor cores. For example, the processor 720 may include a multi-core, such as a dual core, a quad core, or a hexa core. In some embodiments, the processor may further include cache memory that is placed inside or outside the memory.

According to an embodiment, as at least some of data processing or an operation, the processor 720 may store, in volatile memory, an instruction or data that is received from another component (e.g., the communication circuit 790), may process the instruction or data stored in the volatile memory, and may store the resulting data in nonvolatile memory.

According to an embodiment, the processor 720 may process information received from the communication circuit 790, the sensor 780 and/or the memory 730, and may provide a request for controlling the sensor of a vehicle and/or infrastructure to another vehicle and/or infrastructure different from the vehicle through the communication circuit 790.

According to an embodiment, the processor 720 may establish a communication channel (e.g., a V2V or V2I path) with another vehicle and/or infrastructure through the communication circuit 790. The processor 720 may receive from another vehicle different from the vehicle, sensed data of a designated object which has been obtained through the sensor of the another vehicle through the established communication channel by using the communication circuit 790. The sensed data may include a distance from an external object or a vehicle on which the electronic device 700 has been mounted to another vehicle, an angle formed by a direction in which the front of the another vehicle is directed (or a direction in which the sensor is directed) on the basis of the vehicle on which the electronic device 700 has been mounted or the external object, and a location of the vehicle 700 or the external object.

According to an embodiment, the processor 720 may receive, from a beacon, broadcast information including reference data for a relative location relation between a designated object located at a designated place and the location of the beacon and the data of the designated place.

According to an embodiment, the processor 720 may receive a correction request from infrastructure or another vehicle and may correct sensed data in response to the correction request.

According to an embodiment, the processor 720 may identify that a vehicle on which the processor 720 has been mounted enters a GPS shadow area and may transmit a positioning service to a plurality of other vehicles through the communication circuit 790.

According to an embodiment, the processor 720 may correct an image that is obtained by photographing the side of another vehicle (e.g., a vehicle located in front of a vehicle on which the electronic device 700 has been mounted) as an image corresponding to a front view of the front vehicle based on sensed data obtained through the communication circuit 790. The processor 720 may determine whether the front vehicle has failed based on the image or the corrected image.

Referring to FIG. 8, when a vehicle 810 is located within a designated distance d from a beacon 820, the electronic device 700 may receive broadcast information broadcasted by the beacon 820 through a communication circuit (e.g., the communication circuit 790 in FIG. 7). The broadcast information may include reference data indicative of a relative location relation between a designated object 830 located at a designated place and the location of the beacon 820 and data for requesting that the detection of the designated object be performed through a sensor (e.g., the sensor 780 in FIG. 7) of the electronic device 700.

The processor (e.g., the processor 720 in FIG. 7) may identify that the vehicle 810 on which the electronic device 700 has been mounted has entered an area 825 apart from the beacon 820 by the certain distance d by receiving the broadcast information broadcasted by the beacon 820. Furthermore, the processor 720 may obtain, from the beacon, sensed data indicative of a relative location relation between the designated object 830 and the vehicle 810 through the sensor 780 based on the data of the designated place that includes data indicative of the object located at the designated place, in response to the broadcast information being received.

The designated object 830 may be a reference point that is provided by the vehicle 810 or infrastructure 850 for the correction of the sensor 780 that is included in the electronic device 700 of the vehicle 810 or a sensor that is included in an electronic device 800 of the infrastructure 850. For example, the designated object 830 may be disposed at the place of a designated location. The designated object 830 and the beacon 820 may be spaced apart from each other. A relative location relation between the designated object 830 and the beacon 820 may be stored in the beacon 820. The beacon 820 may store reference data indicative of the relative location relation with the designated object 830 and may transmit the reference data to the vehicle 810 or the infrastructure 850 when a certain condition is satisfied. According to an embodiment, the electronic device 700 may obtain the sensed data indicative of the relative location between the designated object 830 and the vehicle 810 through the sensor 780, in response to the reception of the broadcast information including the reference data and the data of the designated place that have been received from the beacon. The sensed data or the reference data may include a distance, a direction, an angle, or a location between the vehicle 810 and the designated object 830 or between the beacon 820 and the designated object 830 in order to indicate the location relation between the vehicle 810 and the designated object 830 or between the beacon 820 and the designated object 830.

According to an embodiment, the electronic device 700 may identify an error between the sensed data and the reference data in response to the sensed data being obtained. The electronic device 700 may obtain a difference between the value of a distance, an angle, or a location that constitutes the sensed data and the value of a distance, angle, or a location that constitutes the reference data. For example, the electronic device 700 may identify the degree of an error by obtaining a difference value between the reference data and the sensed data in translation and rotation with respect to x, y, and z axes. The electronic device 700 may form error values between the reference data and the sensed data in a matrix form relating to the translation or rotation.

The electronic device 700 may identify whether the error is within a predetermined reference range or whether the error is out of the predetermined reference range based on the identified error. For example, the electronic device 700 may store, in memory (e.g., the memory 730 in FIG. 7), the reference range that has been previously designated in relation to an error tolerance of the sensor 780. The electronic device 700 may perform a comparison with the reference range when an error is present between the reference data and the sensed data. When identifying that the error is within the reference range, the electronic device 700 may determine that an operation of the sensor 780 is in a normal state and may determine the correction of the sensor 780 is not required.

According to an embodiment, when identifying that the error is out of the reference range, the electronic device 700 may determine that an operation of the sensor 780 is in an abnormal state and may determine that the correction of the sensor 780 is required.

When determining that the correction of the at least one sensor is required, the electronic device 700 may transmit to the infrastructure 850 or the another vehicle 840, a signal providing notification that the state of the vehicle 810 is the abnormal state. The signal that provides notification of the abnormal state may include information that provides notification that the vehicle 810 drives in the state in which the sensor has failed or information related to the sensed data and correction request of the vehicle 810.

When receiving the sensed data, the another vehicle 840 or the infrastructure 850 may determine that the sensor 780 of the vehicle 810 is abnormal. When receiving the sensed data, the another vehicle 840 or the infrastructure 850 may calculate a correction value for the sensed data.

Another vehicle 840 or the infrastructure 850 may transmit the correction value to the vehicle 810. The transmission and reception of the sensed data and the transmission and reception of the correction values between another vehicle and the vehicle 810 may be performed through V2V communication. The transmission and reception of the sensed data and the transmission and reception of the correction values between the infrastructure 850 and the vehicle 810 may be performed through V2I communication but are not limited thereto.

The processor 720 that has transmitted the correction value may compare and analyze the reference data and the sensed data. The reference data is a fixed distance, angle and/or location of an object which may be used as a reference point in infrastructure or a vehicle. The sensed data is a value obtained by observing a distance, an angle and/or a location for the reference point in infrastructure or a vehicle.

The processor 720 may perform a correction by calculating the translation and rotation of the reference data versus the sensed data with respect to the x, y, and x axes. In performing the correction, translation and rotation for each of the axes of an environment recognition sensor that is mounted on a vehicle and infrastructure may be applied.

According to an embodiment, the electronic device 700 of the vehicle 810 may receive a corresponding correction value and may correct the sensed data of the vehicle based on the corresponding correction value.

According to another embodiment, when determining that the correction of the sensor 780 is required, the electronic device 700 of the vehicle 810 may autonomously calculate a correction value. The electronic device 700 may correct the sensed data based on the autonomously calculated correction value.

According to an embodiment, the infrastructure 850 may execute the same instruction as a plurality of instructions that has been executed by the electronic device 700 through the electronic device 800. For example, a sensor (e.g., the environment recognition sensor) of the electronic device 800 may collect the sensed data (or the observed value) (a distance, an angle and/or a location) of the designated object 830. The electronic device 800 may receive the sensed data as the reference data, and the sensor of the electronic device 800 may receive the sensed data of the vehicle 810 that has entered the designated area 825 of the beacon 820. If a difference between the reference data and the sensed data is great, the electronic device 800 may transmit a correction request to the vehicle 810 through the communication circuit. The vehicle may correct sensed data that has been observed by the sensor 780 of the vehicle 810 based on the received correction value.

A correction value calculated by the electronic device 700 of the vehicle 810 and a correction value calculated by the electronic device 800 of the infrastructure 850 may be calculated as a translation and rotation value of each of the axes (the x axis, the y axis, and the z axis) that is necessary for a correction value of each sensor. The translation and rotation value for a correction may consist of a correction matrix. The processor 720 may perform the correction of the sensor 780 based on the correction matrix or the correction value. For example, the processor 720 may update sensed data by incorporating the correction matrix when the sensor 780 that needs to be corrected obtains the sensed data. As another example, the processor 720 may correct an initial value of the sensor 780.

According to another embodiment, the infrastructure 850 may receive sensed data from the vehicle 810 and may transmit a correction instruction to the vehicle 810 based on a condition in which a difference between the received sensed data and sensed data sensed by the infrastructure 850 is out of a reference range by comparing the received sensed data and the sensed data sensed by the infrastructure 850. The vehicle 810 may also autonomously execute a correction based on a condition in which the sensed data received from the infrastructure 850 and the sensed data sensed by the vehicle 810 is out of the reference range.

According to an embodiment, the infrastructure 850 does not always transmit a sensor value to a vehicle around the infrastructure 850 but may transmit sensed data based on a condition in which the vehicle is identified as being in a specific state. The specific state may be the state in which the infrastructure 850 has identified that the vehicle drives abnormally. For example, the infrastructure 850 may identify that the state of a sensor of the vehicle is the abnormal state or may identify that the vehicle does not drive on a lane and the vehicle operates abnormally.

The transmitted signal may explicitly (bit or flag) represent the correction instruction and may represent the correction instruction as a time-frequency domain.

According to another embodiment, if two or more vehicles are present around the infrastructure 850, the vehicle 810 may detect the instability of the another vehicle 840. The processor 720 of the electronic device 700 may obtain first sensed data of the designated object 830 through the sensor 780. The processor 720 may receive second sensed data of the another vehicle 840 for the designated object 830 from the another vehicle 840. The processor 720 may detect the instability of the another vehicle 840 by comparing the first sensed data obtained through the sensor 780 and the second sensed data, in response to the second sensed data of the another vehicle 840 being received.

As another example, the processor 720 may determine accurate sensed data by comparing the first sensed data and the second sensed data with reference data. If the second sensed data of the another vehicle 840 is inaccurate, the processor 720 may transmit to the another vehicle 840 or the infrastructure 850, a signal indicating that the sensor of the another vehicle 840 is abnormal.

Furthermore, as another embodiment, the vehicle 810 may include an image sensor such as a camera. The vehicle 810 may obtain an image of the another vehicle 840 through the image sensor, and may determine a failure or the instability of the another vehicle 840 based on the obtained image. An operation of the vehicle 810 determining whether the another vehicle 840 is abnormal by obtaining the image of the another vehicle is specifically described with reference to FIGS. 11, 12A, and 12B.

The vehicle 810 may request the infrastructure 850 to check a sensor value of the another vehicle 840 based on the detection. The infrastructure 850 may request the correction of the sensor included in the another vehicle 840 through communication with the another vehicle 840, in response to the request.

According to another embodiment, if an area that the vehicle 810 has entered and that is apart from the beacon 820 by the certain distance d is a GPS shadow area or if it is difficult to measure the coordinates of the vehicle because a GPS signal is not smooth, the vehicle 810 may obtain sensed data by using the calculation of the global coordinates (i.e., the positioning service) in the shadow section, which has been described with reference to FIG. 3.

According to an embodiment, an operation of detecting the instability of the sensor of the infrastructure 850 may be similar to an operation of detecting the instability of the another vehicle 840. The processor 720 of the electronic device 700 may obtain first sensed data of the designated object 830 through the sensor 780. The processor 720 may receive from the infrastructure 850, second sensed data of the infrastructure 850 for the designated object 830. The processor 720 may detect the instability of the infrastructure 850 by comparing the first sensed data obtained through the sensor 780 and the second sensed data, in response to the second sensed data of the infrastructure 850 being received.

According to another embodiment, the infrastructure 850 may compare sensed data detected by a sensor of the infrastructure 850 and sensed data detected by the sensor 780 of the vehicle 810 and may correct the sensor of the infrastructure 850 based on the sensed data of the vehicle 810 if the sensed data detected by the vehicle 810 is more accurate.

The vehicle 810 and the another vehicle 840 may be autonomous vehicles. The infrastructure 850 may provide the stability of an autonomous driving system based on a sensor value and a data value that are received from the autonomous vehicle.

Figure 9:
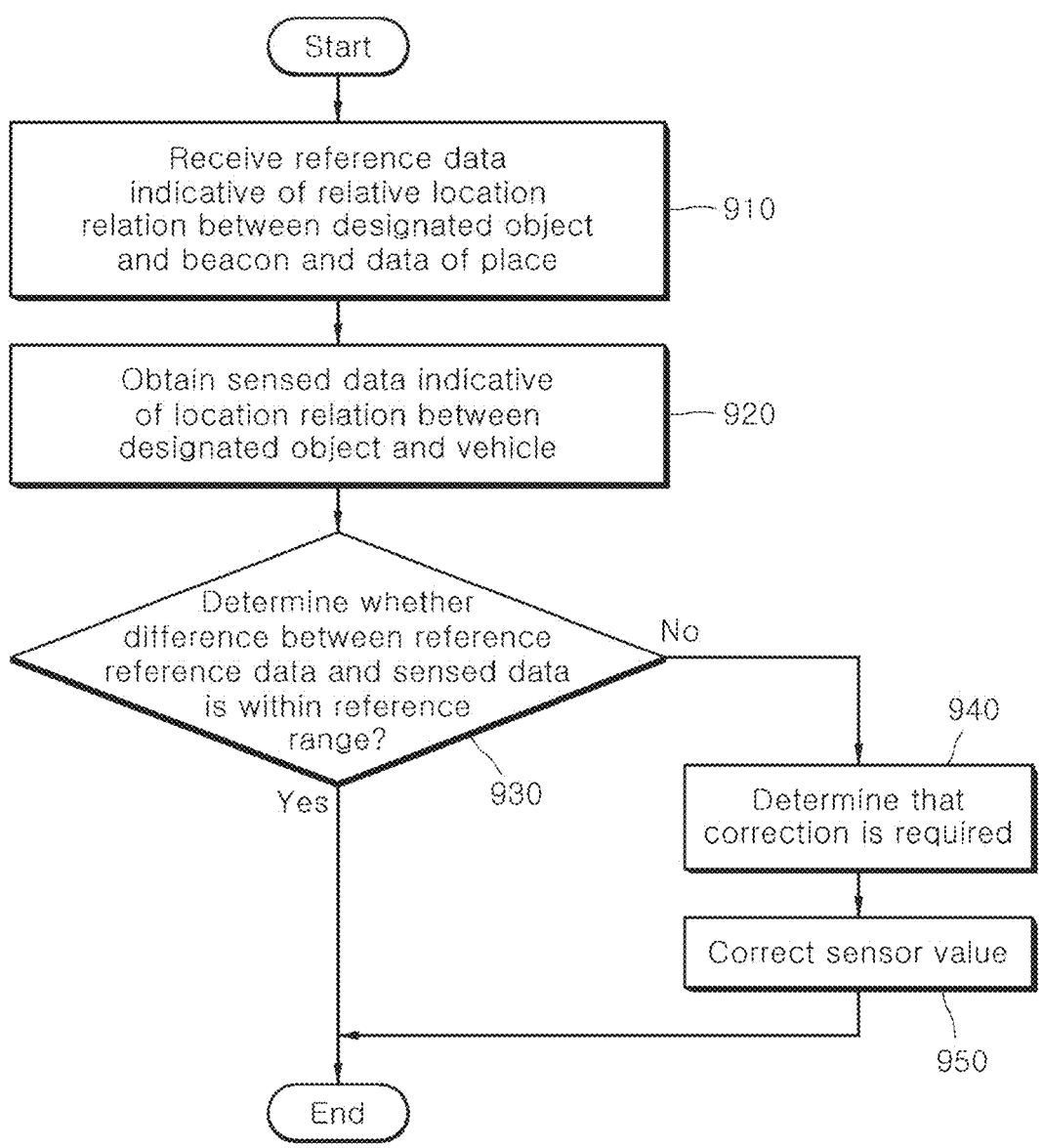
FIG. 9 is a flowchart illustrating an operation of determining that the correction of a sensor is required according to an embodiment.
Figure 10:
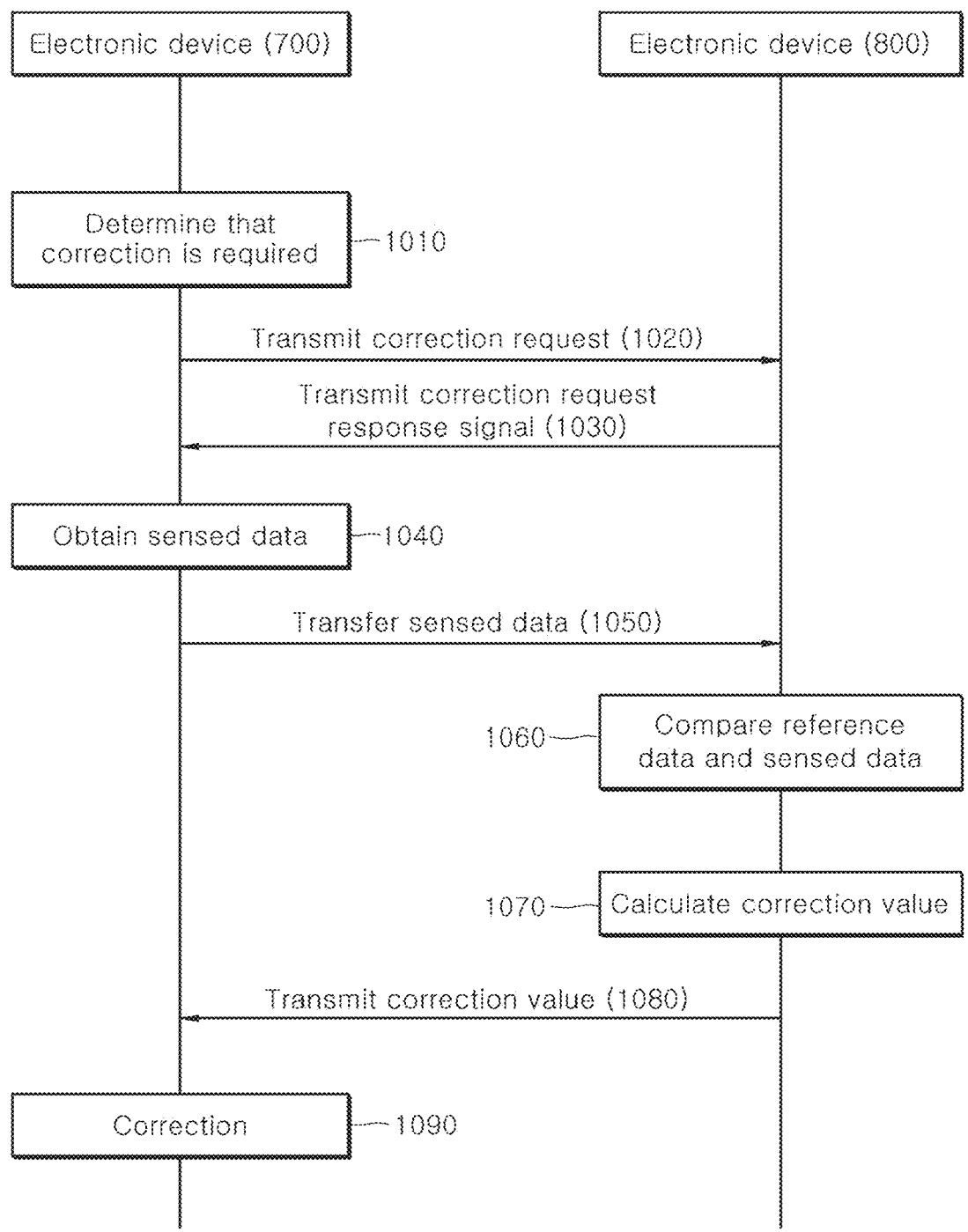
FIG. 10 is a signal flowchart between the electronic device and infrastructure for the correction of a sensor between the electronic device and the infrastructure according to an embodiment.

FIG. 9 is a flowchart illustrating an operation of determining that the correction of a sensor is required according to an embodiment. FIG. 10 is a signal flowchart between the electronic device and infrastructure for the correction of a sensor between the electronic device and the infrastructure according to an embodiment.

Referring to FIG. 9, at operation 910, the processor 720 of the electronic device 700 may receive reference data indicative of a relative location relation between a designated object and a beacon and the data of a place. A processor (e.g., the processor 720 in FIG. 7) of a vehicle (e.g., the vehicle 810 in FIG. 8) on which the electronic device 700 has been mounted may receive the reference data and the data of the designated place from the beacon (e.g., the beacon 820 in FIG. 8) through a communication circuit (e.g., the communication circuit 790 in FIG. 7). The reference data may indicate a relative location relation between the beacon 820 and a designated object located at a designated place.

According to an embodiment, if a vehicle is located within the designated distance d1 from the beacon 820, the vehicle 810 may receive broadcast information from the beacon. The broadcast information may further include a signal to request that the detection of a designated object be performed through a sensor of the electronic device 700 that has been mounted on the vehicle 810.

At operation 920, the processor 720 of the electronic device 700 may obtain sensed data indicative of a location relation between the designated object and the vehicle. The processor (e.g., the processor 720 in FIG. 7) of the electronic device 700 may obtain the sensed data indicative of the relative location relation between the designated object and the vehicle through the sensor, in response to the reception of the broadcast information including the signal to request that the detection of the designated object be performed.

At operation 930, the processor 720 of the electronic device 700 may determine whether a difference between the reference data and the sensed data is within a predetermined reference range. The processor (e.g., the processor 720 in FIG. 7) of the electronic device 700 may determine whether an error is within the reference range by comparing the reference data and the sensed data that have been obtained through a communication circuit (e.g., the communication circuit 790 in FIG. 7). The reference range may be a predetermined range and may be stored in the memory of the electronic device 700. If a difference between the sensed data and the reference data is out of the reference range, at operation 940, the processor 720 may determine that the correction of the sensor is required. For example, the processor 720 may calculate a difference between the sensed data consisting of a translation matrix or a rotation matrix and the reference data consisting of a translation matrix or a rotation matrix, may compare the calculated difference with a predetermined range, and may determine that the correction is required based on a result of the comparison.

At operation 950, the processor (e.g., the processor 720 in FIG. 7) of the electronic device 700 may calculate a correction value and may correct the sensed data based on the calculated correction value.

As another example, the processor (e.g., the processor 720 in FIG. 7) of the electronic device 700 may transmit a correction request for the sensor 780 to an electronic device of the infrastructure 850 or the another vehicle 840 through a communication circuit (e.g., the communication circuit 790 in FIG. 7). The processor 720 may receive the calculated correction value from the infrastructure 850 or the another vehicle 840 and may correct the sensed data based on the calculated correction value.

The processor 720 may perform the correction according to the following operation. The processor 720 may obtain reference data for a fixed distance, angle, and location of an object, which may be used as a reference in the infrastructure 850, the beacon 820, or the vehicle 810. The processor 720 may calculate a correction value or a correction matrix by calculating the translation and rotation of the reference data versus the sensed data with respect to x, y, and z axes through a comparison with the sensed data. The processor 720 may correct an initial value of the sensor based on the calculated correction value or correction matrix or may update the sensed data by incorporating the correction matrix when the sensor 780 that needs to be corrected obtains the sensed data.

Referring to FIG. 10, at operation 1010, a processor (e.g., the processor 720 in FIG. 7) of the electronic device 700 may determine (1010) that the correction of a sensor (e.g., the sensor 780 in FIG. 7) is required. The processor 720 may determine that the correction is required by detecting that the sensor 780 is inaccurate. For example, the processor 720 may determine that a difference between sensed data indicative of a relative location relation with a designated object that is disposed at a designated place and reference data indicative of a relative location relation between the beacon 820 and the designated object, which is obtained from a beacon (e.g., the beacon 820 in FIG. 8) is out of a reference range. The processor 720 may determine that the correction of the sensor 780 is required based on the determination.

At operation 1020, the processor 720 may transmit a correction request to infrastructure (e.g., the infrastructure 850 in FIG. 8) through the communication circuit 790 in response to the correction being required. As the correction is determined to be required, the processor 720 may transmit to the electronic device 800 of the infrastructure 850, a correction request signal including a reply request indicating that a correction operation can be performed with respect to the infrastructure.

At operation 1030, the electronic device 800 of the infrastructure 850 may transmit a correction request response signal to the electronic device 700 in response to the reception of the correction request signal. In response to the reception of the correction request signal, the electronic device 800 may determine whether the correction operation can be performed along with the electronic device 800 and may transmit the correction request response signal indicating that the correction request can be performed.

At operation 1040, the electronic device 700 may transfer, to the sensor (e.g., the sensor 780 in FIG. 7), a request that sensed data indicative of a relative location relation between the designated object 830 and the electronic device 700 be obtained, in response to the reception of a response to the correction request. A sensor (e.g., the sensor 780 in FIG. 7) of the electronic device 700 may detect a distance, location, or angle of the designated object 830, and may transfer the distance, location, or angle to the processor 720. The processor 720 may obtain the sensed data indicative of the relative location relation between the designated object 830 and the electronic device 700, based on the received distance, location, or angle.

At operation 1050, the electronic device 700 may transfer, to the electronic device 800 of the infrastructure 850, the sensed data that has been transferred or obtained from the sensor 780. At operation 1060, the electronic device 800 may compare the sensed data that has been transferred by the electronic device 700 and obtained from the sensor 780 of the electronic device 700 and reference data. The sensed data and the reference data may be values or a matrix including the location, angle, or distance. The electronic device 800 may calculate a difference between the sensed data and the reference data.

At operation 1070, the processor of the infrastructure may calculate a correction value in response to the determination. The electronic device 800 may calculate the correction value of the sensor 780 based on the calculated difference for the reference data. The correction value may have a format corresponding to a value or matrix that includes the location, angle, or distance of the sensed data and the reference data.

At operation 1080, the electronic device 800 of the infrastructure 850 may transmit the calculated correction value to the electronic device 700. At operation 1090, the processor 720 that has received the correction value may correct the sensed data based on the received correction value. The electronic device 700 may correct the sensed data of the sensor based on the correction value received from the electronic device 800.

In the operation of FIG. 10, an operation of correcting the inaccuracy of the sensor of the electronic device 700 of the vehicle 810 has been described, but the operation of FIG. 10 may also be applied to a case in which a sensor included in the electronic device 800 of the infrastructure 850 is inaccurate. The correction of the sensor included in the electronic device 800 of the infrastructure 850 may be performed by an operation of the electronic device 700 performing a correction request in response to the correction request being transmitted by the electronic device 800.

As the electronic device 700 according to the embodiment transmits to the infrastructure 850, sensed data of the designated object 830 while the vehicle 810 moves, the infrastructure 850 may correct a sensor value of a vehicle. Accordingly, although an error of the sensor occurs while the vehicle 810 performs autonomous driving, the error of the sensor can be corrected without a separate sensor correction task. The electronic device 700 can guarantee the stability and accuracy of an autonomous vehicle because the accuracy of a sensor can be maintained in real time.

Figure 11:
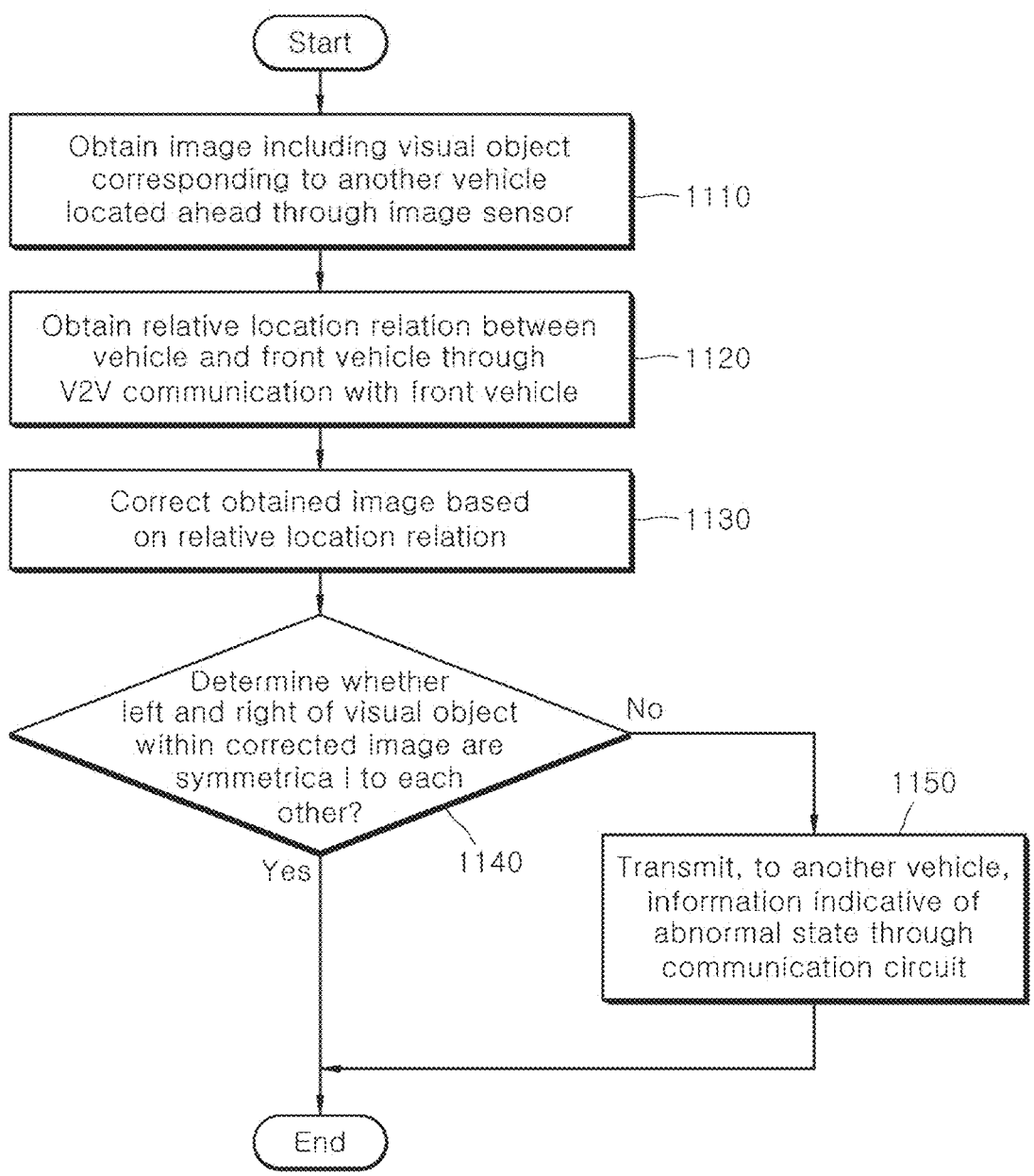
FIG. 11 is a flowchart in which the electronic device determines whether another vehicle is normal according to an embodiment.
Figure 12A:
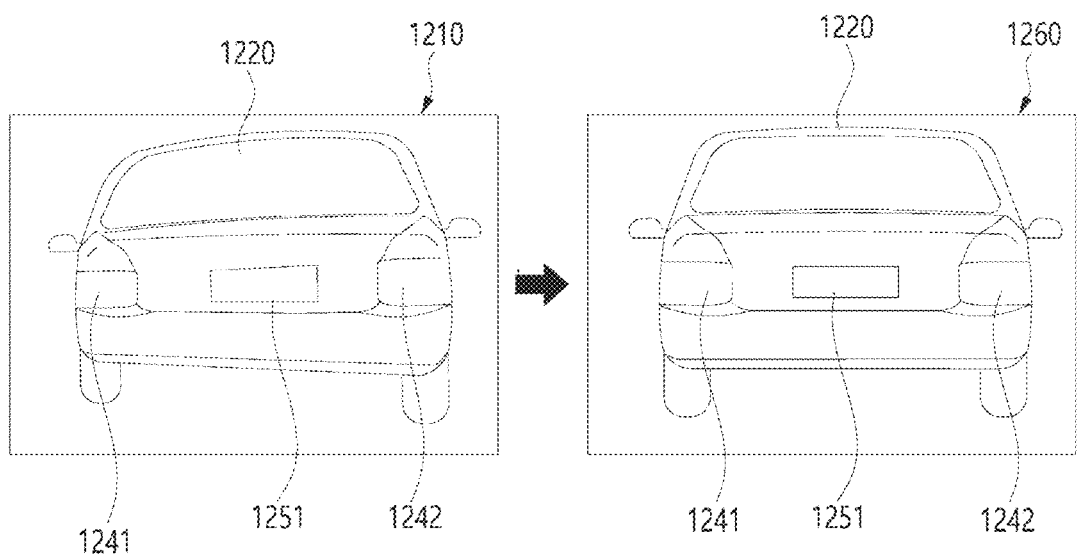
FIG. 12A illustrates an example in which the electronic device corrects an image of another vehicle according to an embodiment.
Figure 12B:
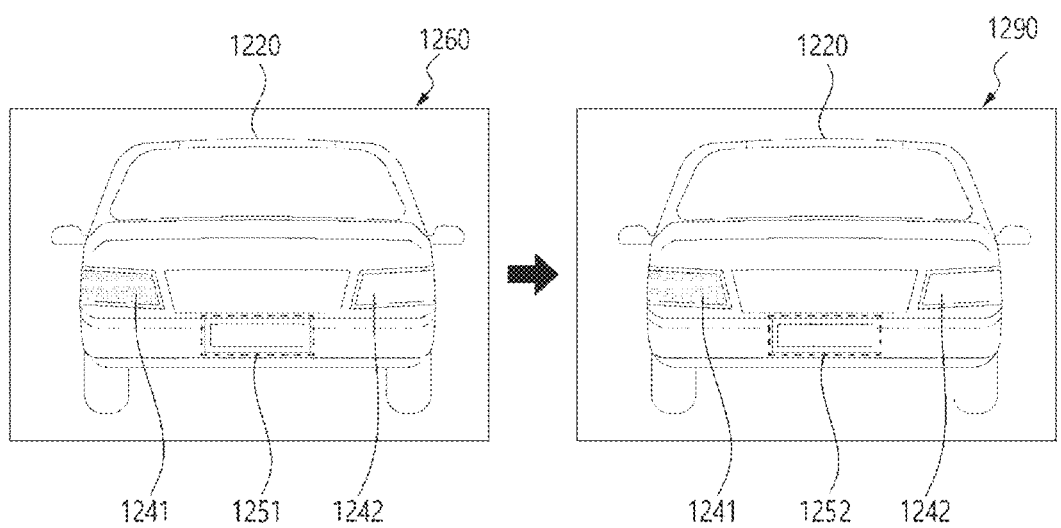
FIG. 12B illustrates an example in which the electronic device de-identifies a part of an image of another vehicle according to an embodiment.

FIG. 11 is a flowchart in which the electronic device determines whether another vehicle is abnormal according to an embodiment. FIG. 12A illustrates an example in which the electronic device corrects an image of another vehicle according to an embodiment. FIG. 12B illustrates an example in which the electronic device de-identifies a part of an image of another vehicle according to an embodiment.

Referring to FIGS. 11, 12A, and 12B, an electronic device (e.g., the electronic device 700 in FIG. 7) may include an image sensor (e.g., the sensor 780 in FIG. 7) as an example of a camera or an optical input device. The image sensor may obtain a surrounding environment of a vehicle (e.g., the vehicle 810 in FIG. 8) on which the electronic device 700 has been mounted, in the form of an image. For example, the image sensor may obtain an image of another vehicle (e.g., the another vehicle 840 in FIG. 8) different from the vehicle 810.

At operation 1110, the electronic device 700 may obtain an image 1210, including a visual object 1220 corresponding to the another vehicle 840 located in front of the vehicle 810, through the image sensor. For example, as in FIG. 8, the vehicle 810 and the another vehicle 840 may drive on different lanes. In this case, as in the image 1210 of FIG. 12A, the visual object 1220 corresponding to the another vehicle 840 may have a distorted shape.

At operation 1120, the electronic device 700 may obtain a relative location relation between the vehicle and the front vehicle through a V2V communication path with the front vehicle. For example, the electronic device 700 may obtain the relative location relation with the another vehicle 840 through a V2V communication path with the another vehicle 840 placed in front of the vehicle 810 on which the electronic device 700 has been mounted. The vehicle 810 and the another vehicle 840 may drive on different lanes. The electronic device 700 may obtain information, including a distance, direction or angle with the another vehicle, through the communication circuit 790. For example, an antenna module controlled by the communication circuit 790 may radiate a beam having directivity. A distance may be detected based on the intensity of the beam. An angle that is formed by a direction in which the vehicle 810 is directed and a direction in which the another vehicle 840 is directed from a direction in which the beam is directed may be obtained. As another example, if the electronic device 700 is present at a location that neighbors another vehicle, the electronic device 700 may obtain information including a distance, a direction, or an angle by using LIDAR, radar, an ultrasonic sensor, etc.

When entering a GPS shadow area, the vehicle 810 on which the electronic device 700 has been mounted may obtain a relative location relation with the another vehicle 840 through V2V communication with the another vehicle 840, which has been described with reference to FIG. 3.

At operation 1130, a processor (e.g., the processor 720 in FIG. 7) of the electronic device 700 may correct the obtained image based on the relative location relation. For example, the processor 720 may obtain a corrected image 1260 based on the relative location relation from the image 1210 including the visual object 1220 of the another vehicle 840. For example, if the another vehicle 840 drives on a lane on the left of the vehicle 810, the visual object 1220 indicative of the another vehicle 840 may be distorted. For example, the right height of the visual object 1220 may be higher than the left height thereof. A right taillight 1242 included in the visual object 1220 may be formed to be greater than a left taillight 1241 included therein. The electronic device 700 may correct the image of the another vehicle 840 based on the relative location relation to make the vehicle look as if the vehicle drives on the same lane. For example, the electronic device 700 may identify an angle or direction formed by the vehicle 810 and the another vehicle 840 through the communication circuit 790, based on the relative location relation, and may identify the width, etc. of the vehicle based on the obtained image and a distance included in the relative location relation. The electronic device 700 may determine a distortion ratio of the visual object based on the identified angle or direction of the another vehicle 840. The distortion ratio may mean a height ratio between a left edge and a right edge. The electronic device 700 may process the image 1210 as the corrected image 1260 based on the determined distortion ratio.

At operation 1140, the processor 720 of the electronic device 700 may determine whether the left and right of the corrected image 1260 are symmetrical to each other.

When identifying that the right taillight 1242 of the visual object 1220 included in the image 1260 is turned on and the left taillight 1241 of the visual object 1220 included therein is not turned on, the electronic device 700 may determine that the visual object 1220 is asymmetrical. As another example, if a part (e.g., a bumper) of the visual object 1220 included in the image 1260 has been distorted, the processor 720 of the electronic device 700 may determine that the visual object 1220 is asymmetrical compared to the remainder of the image that has not been distorted.

The processor 720 may determine that the another vehicle 840 corresponding to the visual object 1220 has a failure or is in the abnormal state based on the visual object 1220 being determined to be asymmetrical, and may transmit, to the another vehicle 840 and the surrounding infrastructure 850, a signal indicating that the another vehicle 840 has a failure or is in the abnormal state through a communication circuit (e.g., the communication circuit 790 in FIG. 7) in response to the determination.

According to an embodiment, in order to determine whether the visual object 1220 is asymmetrical, the electronic device 700 may detect the visual object 1220 corresponding to a vehicle area within the image 1260, may crop a vehicle area corresponding to the detected visual object 1220, and may determine whether the visual object 1220 is asymmetrical through a Sobel operation for the cropped vehicle area. After detecting a vertical edge of the image 1260 through the Sobel operation, the processor 720 may determine whether the left and right of the visual object 1220 are symmetrical to each other based on the detected vertical edge, but the present disclosure is not limited thereto.

As another example, the electronic device 700 may execute object identification and classification for the taillights 1241 and 1242 through learning for various situations using a deep learning scheme and may determine whether the left and right of the image 1210 including the front vehicle 1220 are symmetrical to each other through a method of detecting results based on the object identification and classification. A convolution neural network (CNN) may be used as an artificial neural network that is used to analyze the images. After checking locations of the left taillight 1241 and the right taillight 1242, the electronic device 700 may check RGB values of colors at the locations, and may determine that the another vehicle 840 has a failure or is in the abnormal state when an error range between the two RGB values is great.

According to an embodiment, a license plate 1251 included in the visual object 1220 included in the image 1260 is asymmetric. Accordingly, the electronic device 700 may determine that the visual object 1220 is symmetrical except the license plate 1251. In addition to the license plate, the processor 720 of the electronic device 700 may determine the symmetry of the vehicle except an asymmetrical area (e.g., a rear wiper area). According to an embodiment, the processor 720 may perform learning for an asymmetric area of the vehicle depending on a license plate of a vehicle and the type of vehicle by using deep learning or a neural network. The processor 720 may exclude an asymmetric area from the image 1260 based on such learning results.

At operation 1150, when determining that the visual object included in the image is asymmetrical, the processor 720 of the electronic device 700 may transmit to the another vehicle 840, information indicating that the front vehicle is in the abnormal state through a communication circuit (e.g., the communication circuit 790 in FIG. 7).

Referring back to FIG. 12B, after obtaining the image 1260, the electronic device 700 may de-identify the license plate area 1251 of the visual object 1220 included in the image 1260. For example, the license plate 1251 may be personal information, that is, information that is sensitive to exposure to others. Accordingly, the electronic device 700 may need to de-identify the license plate 1251, if necessary.

In order to de-identify the license plate 1251, the processor 720 of the electronic device 700 may obtain an image 1290 including the license plate 1252 that has been subjected to blur processing through a blur process when recognizing the license plate 1251.

According to an embodiment, the electronic device 700 may keep the image 1260 in a secure area and may secure the image 1290 in a common area. The secure area may be an area that has been encrypted and to which access has been limited, within the memory 730 of the electronic device 700. The common area may be the remaining some area except the secure area within the memory 730. The image 1260 kept in the secure area may be accessed and obtained by only a public institution or a user who has a special key.

According to an embodiment, the image 1260 including picture data or image data in which personal information may be identified may be provided to a public institution. After checking the picture information or image information, the public institution may transfer the picture information or image information to another institution (e.g., a garage) or a person (e.g., a data provider). The another institution or person may access only the image 1290 that is located in the common area.

In the aforementioned embodiment, the processor 720 is configured to perform an operation of detecting whether a vehicle ahead is abnormal without an external input and notifying the another vehicle 840 or the infrastructure 850 of the abnormality of the vehicle, but a driver of the vehicle may recognize the abnormality, and the aforementioned algorithm may be performed by the processor 720 through the driver's input.

The electronic device 700 according to the embodiment may detect the abnormal state or abnormal movement of another vehicle by detecting the asymmetry of the another vehicle in an image that includes a visual object corresponding to the another vehicle located in front of the vehicle 810, and may provide notification of such a state to the another vehicle. The electronic device 700 may provide a warning to the another vehicle even without a separate input from a user. The another vehicle to which the warning has been provided may correct a sensor of the another vehicle based on the correction operation that has been described after FIG. 7. Accordingly, a user of the another vehicle can receive a warning of the abnormal state while driving, and can correct the sensor of the another vehicle even without a separate manipulation for the another vehicle, thereby securing driving convenience and stability for autonomous driving.

Figure 13:
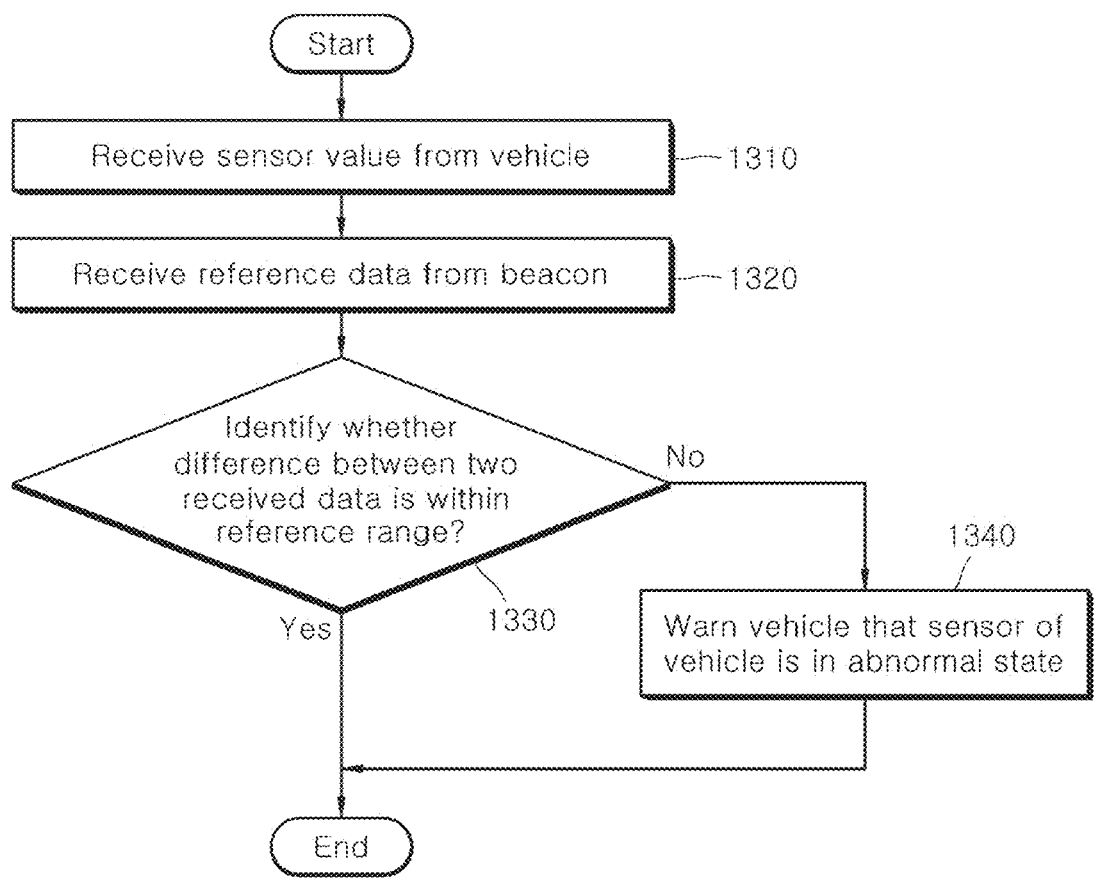
FIG. 13 is an operation flowchart in which the electronic device determines whether another vehicle is abnormal based on sensed data according to an embodiment.

FIG. 13 is an operation flowchart in which the electronic device determines whether another vehicle is abnormal based on sensed data according to an embodiment.

Referring to FIG. 13, at operation 1310, the processor 720 may receive, from another vehicle (e.g., the vehicle 840 in FIG. 8), sensed data that is obtained through a sensor of the another vehicle 840. The sensed data may be data indicative of a relative location relation, such as a location, a distance, or an angle that is obtained as the another vehicle 840 detects the designated object 830 in FIG. 8.

At operation 1320, the processor 720 may receive reference data for the another vehicle 840 from a beacon (e.g., the beacon 820 in FIG. 8) through the communication circuit 790. The reference data may be data indicative of a relative location relation between the beacon 820 and the designated object 830, which has been stored in the beacon 820.

At operation 1330, the processor 720 may determine whether a difference between the sensed data received from the another vehicle 840 and the reference data received from the beacon 820 is within a reference range. The processor 720 may perform operation 1340 when the difference between the reference data and the sensed data is equal to or greater than the reference range.

At operation 1340, the processor 720 may transmit to the another vehicle 840 and infrastructure (e.g., the infrastructure 850 in FIG. 8), information warning that the sensor of the another vehicle 840 is in the abnormal state.

In the aforementioned operation, it has been described that the vehicle 810 receives and determines the sensed data of the another vehicle, but the present disclosure is not limited thereto. Not the vehicle 810, but the electronic device 800 of the infrastructure 850 may perform operation 1310 to operation 1340.

The electronic device of a vehicle or the electronic device of infrastructure according to the embodiment can correct a sensor in real time and increase the accuracy of autonomous driving in that sensed data of another vehicle is received, the sensed data and reference data are compared, the accuracy of the sensed data of the another vehicle is determined, and the abnormal state of the another vehicle is notified.

An electronic device (e.g., the electronic device 700 in FIG. 7) within a vehicle according to the embodiment includes a communication circuit (e.g., the communication circuit 790 in FIG. 7), at least one piece of memory (e.g., the memory 730 in FIG. 7) configured to store a plurality of instructions, at least one sensor (e.g., the sensor 780 in FIG. 7) configured to detect a surrounding environment of the vehicle, and at least one processor (e.g., the processor 720 in FIG. 7) operatively coupled to the communication circuit, the at least one piece of memory, and the at least one sensor. When the plurality of instructions is executed, the at least one processor may be configured to receive broadcast information that is broadcasted by a beacon (e.g., the beacon 820 in FIG. 8) and that includes reference data indicative of a relative location relation between a designated object (e.g., the designated object 830 in FIG. 8) located at a designated place and a location of the beacon and data of the designated place, obtain, through the at least one sensor, sensed data indicative of a relative location relation between the designated object and the vehicle based on the data of the designated place in response to the reception of the broadcast information, identify a difference between the sensed data and the reference data in response to the sensed data being obtained, identify whether the difference is out of a reference range, and determine that the correction of the at least one sensor is required based on the difference being identified as being out of the reference range.

According to an embodiment, when the plurality of instructions is executed, the at least one processor may transmit the sensed data to infrastructure (e.g., the infrastructure 850 in FIG. 8) in response to the correction of the at least one sensor being determined to be required, may receive a calculated correction value based on the sensed data from the infrastructure, and may correct the at least one sensor based on the calculated correction value.

According to an embodiment, when the plurality of instructions is executed, the at least one processor may calculate a correction value for the correction of the sensor based on the sensed data and the reference data in response to the correction of the at least one sensor being determined to be required and may correct the at least one sensor based on the correction value.

According to an embodiment, when the plurality of instructions is executed, the at least one processor may be configured to determine that the correction of the at least one sensor is not required based on the difference being identified as being within the reference range.

According to an embodiment, the broadcast information may be received by the electronic device when the vehicle is located within a designated distance (e.g., d in FIG. 8) from the beacon.

According to an embodiment, the broadcast information may further include data for requesting the detection of the designated object located at the designated place to be performed through the at least one sensor.

According to an embodiment, when the plurality of instructions is executed, the at least one processor may transmit, to another vehicle (e.g., the vehicle 840 in FIG. 8), a signal providing notification that the at least one sensor is abnormal by performing communication through a vehicleto-vehicle (V2V) communication path between an external electronic device within the another vehicle different from the vehicle and the electronic device, based on the correction of the at least one sensor being determined to be required.

According to an embodiment, when the plurality of instructions is executed, the at least one processor may transmit, to infrastructure (e.g., the infrastructure 850 in FIG. 8), a signal providing notification that the at least one sensor is abnormal by performing communication through a vehicle-to-infrastructure (V2I) communication path between the infrastructure and the electronic device, based on the correction of the at least one sensor being determined to be required.

According to an embodiment, when the plurality of instructions is executed, the at least one processor may be configured to receive from a plurality of other vehicles different from the vehicle, signals including information on locations of the plurality of other vehicles through the communication circuit and to determine a location of the vehicle based on the received signals.

According to an embodiment, when the plurality of instructions is executed, the at least one processor may be configured to receive a signal including information on a location of another vehicle different from the vehicle through the communication circuit, identify a direction in which the signal is received and the intensity of the signal in response to the reception of the signal, identify a distance between the vehicle and the another vehicle based on the intensity of the signal, and determine a location of the vehicle based on the direction in which the signal is received, the identified distance, and the information on the location of the another vehicle.

According to an embodiment, the electronic device further includes an image sensor. When the plurality of instructions is executed, the at least one processor may be configured to obtain an image including a visual object (e.g., the visual object 1220 in FIG. 12A) corresponding to another vehicle located in front of the vehicle through the image sensor, identify a relative location relation between the vehicle and the another vehicle by performing communication through a vehicle-to-vehicle (V2V) communication path between another electronic device within the another vehicle and the electronic device, correct the image based on the identified relative location relation, identify whether the left and right of the visual object included in the corrected image are symmetrical to each other, and determine that the another vehicle is in an abnormal state based on the left and right of the visual object being identified as being asymmetric to each other.

According to an embodiment, when the plurality of instructions is executed, the at least one processor may detect an area (e.g., 1220 in FIG. 12A) corresponding to the visual object within the image, may crop an area corresponding to the detected visual object, may detect a vertical edge through a Sobel operation for the cropped vehicle area, and may identify whether the left and right of the visual object included in the corrected image are symmetrical to each other by determining whether the left and right of the visual object are symmetrical to each other based on the detected vertical edge.

According to an embodiment, when the instruction is executed, the at least one processor may be configured to transmit to the another electronic device, a signal providing notification that the another vehicle is in the abnormal state through the communication circuit, based on the another vehicle being identified as being in the abnormal state.

According to an embodiment, when the instruction is executed, the at least one processor may be configured to transmit, to infrastructure, a signal providing notification that the another vehicle is in the abnormal state through the communication circuit, based on the another vehicle being identified as being in the abnormal state.

According to an embodiment, when the plurality of instructions is executed, the at least one processor may be further configured to identify a license plate (e.g., the license plate 1251 in FIG. 12B) of the another vehicle from the visual object in response to the image including the visual object being obtained and to apply a designate effect (e.g., the license plate 1252 in FIG. 12B) to a certain area including the license plate.

According to an embodiment, when the plurality of instructions is executed, the at least one processor may be further configured to identify the license plate of the another vehicle from the visual object in response to the image being corrected and to apply a designated effect (e.g., 1252 in FIG. 12B) to a certain area including the license plate.

According to another embodiment, a method of an electronic device (e.g., the electronic device 700 in FIG. 7) within a vehicle may include an operation of receiving, by at least one processor (e.g., the processor 720 in FIG. 7) of the electronic device, broadcast information that is broadcasted by a beacon (e.g., the beacon 820 in FIG. 8) and that includes reference data indicative of a relative location relation between a designated object (e.g., the designated object 830 in FIG. 8) located at a designated place and a location of the beacon and data of the designated place through a communication circuit (e.g., the communication circuit 790 in FIG. 7) of the electronic device; an operation of obtaining, by the at least one processor, sensed data indicative of a relative location relation between the designated object and the vehicle based on the data of the designated place in response to the reception of the broadcast information, through at least one sensor (e.g., the sensor 780 in FIG. 7) that is included in the electronic device; an operation of identifying, by the at least one processor, a difference between the sensed data and the reference data in response to the sensed data being obtained; an operation of identifying, by the at least one processor, whether the difference is out of a reference range; an operation of determining, by the at least one processor, that a correction of the at least one sensor is required based on the difference being identified as being out of the reference range; an operation of transmitting, by the at least one processor, the sensed data to infrastructure (e.g., the infrastructure 850 in FIG. 8) in response to the correction of the at least one sensor being determined to be required; an operation of receiving, by the at least one processor, a calculated correction value from the infrastructure based on the sensed data; and an operation of correcting, by the at least one processor, the at least one sensor based on the calculated correction value.

The methods according to the embodiments described in the claims or specification of the present disclosure may be implemented in the form of hardware, software or a combination of hardware and software. In the aforementioned detailed embodiments of the present disclosure, the components included in the present disclosure have been expressed in the singular or plural form depending on a proposed detailed embodiment. However, the singular or plural expression has been selected suitably for a situation proposed for convenience of description, and the present disclosure is not limited to singular or plural components. Although a component has been expressed in the plural form, it may be configured in the singular form. Although a component has been expressed in the singular form, it may be configured in the plural form.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. An electronic device within a vehicle, comprising:
a communication circuit;
at least one piece of memory configured to store a plurality of instructions;
at least one sensor configured to detect a surrounding environment of the vehicle; and
at least one processor operatively coupled to the communication circuit, the at least one piece of memory, and the at least one sensor,
wherein when the plurality of instructions is executed, the at least one processor is configured to:
receive broadcast information that is broadcasted by a beacon and that comprises reference data indicative of a relative location relation between a designated object located at a designated place and a location of the beacon and data of the designated place;
obtain, through the at least one sensor, sensed data indicative of a relative location relation between the designated object and the vehicle based on the data of the designated place in response to the reception of the broadcast information;
identify a difference between the sensed data and the reference data in response to the sensed data being obtained;
identify whether the difference is out of a reference range; and
determine that a correction of the at least one sensor is required based on the difference being identified as being out of the reference range;
an image sensor, wherein when the plurality of instructions is executed, the at least one processor is configured to
obtain an image comprising a visual object corresponding to another vehicle located in front of the vehicle through the image sensor;
identify a relative location relation between the vehicle and the another vehicle by performing communication through a vehicle-to-vehicle) communication path between another electronic device within the another vehicle and the electronic device;
correct the image based on the identified relative location relation;
identify whether a left and right of the visual object included in the corrected image are symmetrical to each other; and
determine that the another vehicle is in an abnormal state based on the left and right of the visual object being identified as being asymmetric to each other.

2. The electronic device of claim 1, wherein when the plurality of instructions is executed, the at least one processor
transmits the sensed data to infrastructure in response to the correction of the at least one sensor being determined to be required;
receives a calculated correction value based on the sensed data from the infrastructure; and
corrects the at least one sensor based on the calculated correction value.

3. The electronic device of claim 1, wherein when the plurality of instructions is executed, the at least one processor calculates a correction value for the correction of the sensor based on the sensed data and the reference data in response to the correction of the at least one sensor being determined to be required, and corrects the at least one sensor based on the correction value.

4. The electronic device of claim 1, wherein when the plurality of instructions is executed, the at least one processor is configured to determine that the correction of the at least one sensor is not required based on the difference being identified as being within the reference range.

5. The electronic device of claim 1, wherein the broadcast information is received by the electronic device when the vehicle is located within a designated distance from the beacon.

6. The electronic device of claim 1, wherein the broadcast information further comprising data for requesting a detection of the designated object located at the designated place to be performed through the at least one sensor.

7. The electronic device of claim 1, wherein when the plurality of instructions is executed, the at least one processor transmits, to another vehicle, a signal providing notification that the at least one sensor is abnormal by performing communication through a vehicle-to-vehicle communication path between an external electronic device within the another vehicle different from the vehicle and the electronic device, based on the correction of the at least one sensor being determined to be required.

8. The electronic device of claim 1, wherein when the plurality of instructions is executed, the at least one processor transmits, to infrastructure, a signal providing notification that the at least one sensor is abnormal by performing communication through a vehicle-to-infrastructure communication path between the infrastructure and the electronic device, based on the correction of the at least one sensor being determined to be required.

9. The electronic device of claim 1, wherein when the plurality of instructions is executed, the at least one processor is configured to receive, from a plurality of other vehicles different from the vehicle, signals comprising information on locations of the plurality of other vehicles through the communication circuit and to determine a location of the vehicle based on the received signals.

10. The electronic device of claim 1, wherein when the plurality of instructions is executed, the at least one processor is configured to receive a signal comprising information on a location of another vehicle different from the vehicle through the communication circuit;
identify a direction in which the signal is received and an intensity of the signal in response to the reception of the signal;
identify a distance between the vehicle and the another vehicle based on the intensity of the signal; and
determine a location of the vehicle based on the direction in which the signal is received, the identified distance, and the information on the location of the another vehicle.

11. The electronic device of claim 1, wherein when the plurality of instructions is executed, the at least one processor detects an area corresponding to the visual object within the image;
crops an area corresponding to the detected visual object;
detects a vertical edge through a Sobel operation for the cropped vehicle area; and
identifies whether the left and right of the visual object included in the corrected image are symmetrical to each other by determining whether the left and right of the visual object are symmetrical to each other based on the detected vertical edge.

12. The electronic device of claim 1, wherein when the instruction is executed, the at least one processor is configured to transmit, to the another electronic device, a signal providing notification that the another vehicle is in the abnormal state through the communication circuit, based on the another vehicle being identified as being in the abnormal state.

13. The electronic device of claim 1, wherein when the instruction is executed, the at least one processor is configured to transmit, to infrastructure, a signal providing notification that the another vehicle is in the abnormal state through the communication circuit, based on the another vehicle being identified as being in the abnormal state.

14. The electronic device of claim 1, wherein when the plurality of instructions is executed, the at least one processor is further configured to identify a license plate of another vehicle from the visual object in response to the image comprising the visual object being obtained, and apply a designate effect to a certain area comprising the license plate.

15. The electronic device of claim 1, wherein when the plurality of instructions is executed, the at least one processor is further configured to identify a license plate of the another vehicle from the visual object in response to the image being corrected, and apply a designated effect to a certain area comprising the license plate.

16. A method of an electronic device within a vehicle, comprising:

receiving, by at least one processor of the electronic device, broadcast information that is broadcasted by a beacon and that comprises reference data indicative of a relative location relation between a designated object located at a designated place and a location of the beacon and data of the designated place through a communication circuit of the electronic device;

obtaining, by the at least one processor, sensed data indicative of a relative location relation between the designated object and the vehicle based on the data of the designated place in response to the reception of the broadcast information, through at least one sensor that is included in the electronic device;

identifying, by the at least one processor, a difference between the sensed data and the reference data in response to the sensed data being obtained;

identifying, by the at least one processor, whether the difference is out of a reference range;

determining, by the at least one processor, that a correction of the at least one sensor is required based on the difference being identified as being out of the reference range;

obtaining, by the at least one processor, an image comprising a visual object corresponding to another vehicle located in front of the vehicle through an image sensor identifying, by the at least one processor, a relative location relation between the vehicle and the another vehicle by performing communication through a vehicle-to-vehicle (V2V) communication path between another electronic device within the another vehicle and the electronic device, correcting, by the at least one processor, the image based on the identified relative location relation, identifying, by the at least one processor, whether a left and right of the visual object included in the corrected image are symmetrical to each other, and determining, by the at least one processor, that the another vehicle is in an abnormal state based on the left and right of the visual object being identified as being asymmetric to each other.

* * * * *